United States Patent
Huang

(10) Patent No.: US 7,120,683 B2
(45) Date of Patent: Oct. 10, 2006

(54) SINGLE SWITCH IMAGE FOR A STACK OF SWITCHES

(75) Inventor: James Ching-Liang Huang, Irvine, CA (US)

(73) Assignee: Zarlink Semiconductor V.N. Inc., Irvine, CA (US)

(*) Notice: Subject to any disclaimer, the term of this patent is extended or adjusted under 35 U.S.C. 154(b) by 801 days.

(21) Appl. No.: 09/824,951

(22) Filed: Apr. 3, 2001

(65) Prior Publication Data

US 2002/0046271 A1 Apr. 18, 2002

Related U.S. Application Data

(60) Provisional application No. 60/194,277, filed on Apr. 3, 2000.

(51) Int. Cl.
*G06F 15/16* (2006.01)

(52) U.S. Cl. .................................. 709/223; 370/352

(58) Field of Classification Search ........ 370/217–220, 370/386–388, 396, 351–353, 401, 250, 402, 370/395.5; 709/223, 239, 242; 307/113, 307/141.8
See application file for complete search history.

(56) References Cited

U.S. PATENT DOCUMENTS

| | | | |
|---|---|---|---|
| 5,459,720 A * | 10/1995 | Iliev et al. .................. 370/393 |
| 5,473,599 A * | 12/1995 | Li et al. ..................... 370/219 |
| 5,629,685 A * | 5/1997 | Allen et al. ............ 340/825.02 |
| 5,754,939 A * | 5/1998 | Herz et al. .................. 455/3.04 |
| 5,802,333 A * | 9/1998 | Melvin ....................... 710/316 |
| 5,892,932 A * | 4/1999 | Kim ............................ 710/316 |
| 5,923,654 A * | 7/1999 | Schnell ....................... 370/390 |
| 6,006,259 A * | 12/1999 | Adelman et al. ........... 709/223 |
| 6,055,561 A * | 4/2000 | Feldman et al. ............ 709/200 |
| 6,188,694 B1* | 2/2001 | Fine et al. ................... 370/402 |
| 6,189,039 B1* | 2/2001 | Harvey et al. .............. 709/232 |
| 6,337,863 B1* | 1/2002 | Nair et al. ............. 370/395.53 |
| 6,473,403 B1* | 10/2002 | Bare ........................... 370/236 |
| 6,556,541 B1* | 4/2003 | Bare ........................... 370/235 |
| 6,751,191 B1* | 6/2004 | Kanekar et al. ............ 370/217 |
| 6,785,272 B1* | 8/2004 | Sugihara ..................... 370/386 |
| 6,853,623 B1* | 2/2005 | Nederveen et al. ......... 370/250 |
| 6,981,034 B1* | 12/2005 | Ding et al. ................. 709/223 |

OTHER PUBLICATIONS

Andrew S. Tanenbaum, "Computer Networks: Third Edition," Prentice Hall, New Jersey, 1996, pp. 16-21 and 28-37.*

* cited by examiner

Primary Examiner—Jungwon Chang
(74) Attorney, Agent, or Firm—Lawrence E. Laubscher, Jr.

(57) ABSTRACT

An architecture for creating a single image for a stack of switches. A plurality of the internetworking devices are provided in a stack configuration for interconnecting networks. Software is executed in each internetworking device such that the stack of internetworking devices appear as a single internetworking device to the interconnected networks.

8 Claims, 11 Drawing Sheets

SINGLE SWITCH IMAGE FOR A STACK OF SWITCHES

This application claims priority under 35 U.S.C. § 119(e) from U.S. Provisional Patent application Ser. No. 60/194,277 entitled "A Framework For Providing A Single Switch Image For A Stack Of Switches" and filed Apr. 3, 2000.

BACKGROUND OF THE INVENTION

1. Technical Field of the Invention

This invention is related to network switches and routers, and more specifically, to an architecture for providing a single switch image from a stack of network switches.

2. Background of the Art

None of the stacking products available in the existing market provides a single switch/router image, but only offer a facility for a single point of management. In these conventional products, each switch/router performs independently. For example, a MAC address learned in Switch A is not be propagated to Switch B in the same stack. Therefore, when Switch B receives packets destined to the MAC address already learned by Switch A, these packets are flooded by Switch B.

In those stacking products with routing functions, each switch routes packets independently, and each switch requires an independent IP address configuration per routing interface. As a result, a stack of N switches with routing functions behave externally as N independent routers. This causes inefficient use of allocated IP addresses. Additionally, packets routed through the stack may be routed more than once, and hence, experience a longer delay.

Fault tolerance is an important feature of a robust network. Conventional practices include intelligent software agents that continuously monitor redundant links. Other methods of increasing fault tolerance include redundant hardware systems, for example, stacking redundancy which ensures no single point of failure for inter-subnet routing, redundant power supplies, and port aggregation of switches, all of which address keeping critical network services active and accessible. However, these are expensive propositions in both hardware and software, and support resources, and still do not provide a fail-safe system.

What is needed is a single switch/router image for a stack of switches which causes a stack of switches to behave externally as a single switch or a single router, if routing functionality is provided. Such an architecture would provide a high level of fault tolerance without the costs associated with conventional redundant hardware and software systems.

SUMMARY OF THE INVENTION

The present invention disclosed and claimed herein, in one aspect thereof, comprises a method of operating a plurality of internetworking devices for interconnecting networks, such that when the internetworking devices are provided in a stack configuration, the stack of internetworking devices appear as a single internetworking device to the interconnected networks.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

In accordance with the following disclosed novel architecture, the following assumptions are made. There is one MAC address per switching node. Each switching node is configured with a distinct two bytes in the switch ID. The switch ID is used in the topology discovery, master election, and switching database maintenance, all of which are discussed in greater detail hereinbelow. Each switching node is configured with the size of the stack, and the stack can be formed when more than half of the switching nodes are connected. There is one stack IP address to provide a single point of remote management. There are also point-to-point connections between switches in the same stack. The source MAC (Media Access Control) address of a BPDU (Bridge Protocol Data Unit) packet will not be learned to prevent continuous port changes caused by protocol packets.

The following terminology is used throughout and hereby provided. A stack port is defined as a port connected to another port of the same stack. A stack tree is the tree rooted at the master, and built by the Topology Discovery protocol to interconnect all switching nodes together. A fully functional Layer 3 (L3) switch is a switch whose stack-wide configurations and routing table are in sync with the master. A head router is elected by each switch. For a fully functional L3 switch, the head router is itself. For a Layer 2 (L2) switch or a non-fully functional L3 switch, the head router is the nearest fully functional L3 switch in the stack tree. If multiple fully functional L3 switches exist with the same distance from a switch, the switch with the smallest switch ID is chosen. The external VLAN domain for a VLAN X at a switching node is defined as the set of non-stack ports that are in X's VLAN domain at the switch.

The disclosed architecture provides a single switch (or router) image for a stack of switches (or routers, where a routing function is desired). To facilitate such an architecture, each switch in the stack is configured with software modules and the following stack-wide configuration information: (1) a stack IP address (i.e., a stack ID), (2) a stack IP subnet mask, (3) a stack Virtual LAN (VLAN) ID (i.e., the VLAN ID of the stack IP subnet), (4) stack size, (5) switch ID, and (6) ports for inter-switch connection within the stack (also called "stack ports").

Figure 1:
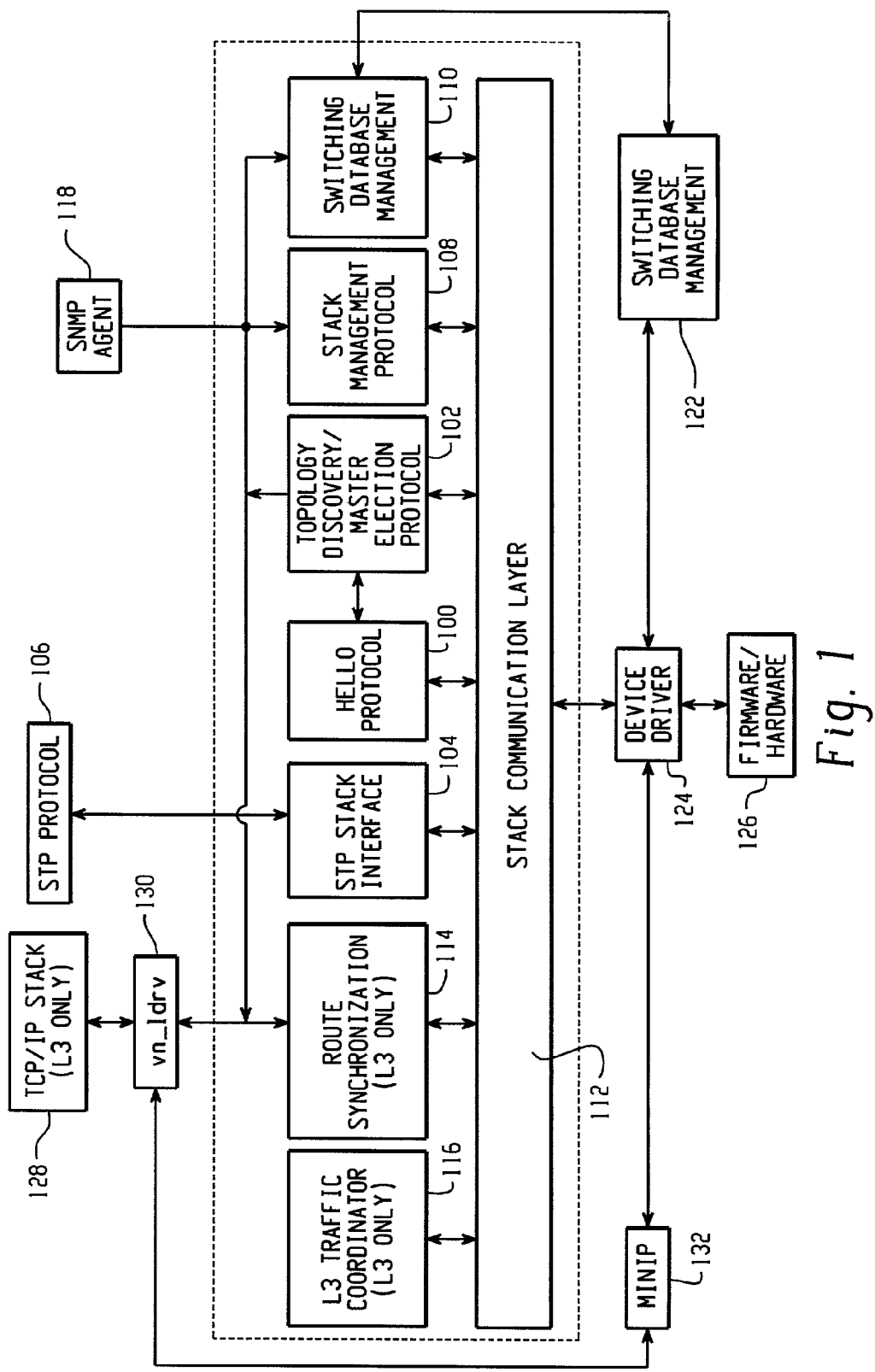
FIG. 1 illustrates a block diagram of the associated software modules for a stackable switch, in accordance with a disclosed embodiment.

Referring now to FIG. 1, there is illustrated a block diagram of the associated software modules for a stackable switch, in accordance with a disclosed alternative embodiment. Note that the blocks located inside the dotted line are those software modules that are related to the disclosed alternative embodiment. The modules include the Hello Protocol module 100, Topology Discovery and Master Election Protocol module102, Spanning Tree Protocol (STP) Stack Interface (SSI) module 104, Stack Management Protocol module 108, Switching Database Synchronization module 110, Stack Communication Layer 112, Route Synchronization module (L3 only) 114, and L3 Traffic Coordinator Module 116.

The Hello Protocol module 100, Topology Discovery and Master Election Protocol module 102, the Stack Management Protocol module 108, and Switching Database Synchronization module 110 each interface to the Stack Communication Layer 112, with the latter three each interconnecting to one another. The Hello Protocol module 100 interfaces directly to the Topology Discovery and Master Election Protocol module 102. The SNMP software agent 118 interfaces to each of the Stack Management Protocol module 108, the Switching Database Synchronization module 110, the Topology Discovery and Master Election Protocol module 102, the Route Synchronization module 114, and a vn_ldrv module 130. The Route Synchronization module 114 interfaces to the vn_ldrv module 130. Each of the L3 Traffic Coordinator module 116, the Route Synchronization module 114, the STP stack Interface 104, and L3 Traffic Coordinator module 116 also interface to the Stack Communication Layer 112. The Switching Database Synchronization module 110 interfaces to the Switching Database Management module 122 for synchronization control thereof. The Device Driver block 124 interfaces with each of the Stack Communication Layer 112, the Switching Database Management module 122, the Firmware/Hardware block 126, and a minip module 132. The minip module 132 in turn interfaces with the vn_ldrv module 130. The vn_ldrv block 130 interfaces with a TCP/IP protocol stack 128 for driver control thereof.

Protocol Frame Header

The protocol frame header uses the same header as that of a BPDU frame, but has a protocol ID set to 0xFFFF. Additionally, the stack ID field in the packet is the same as the configured stack IP address. All packets are forwarded by hardware with the highest priority to minimize protocol packet loss. The packets are not subjected to any CPU-bound flow control.

Figure 24:
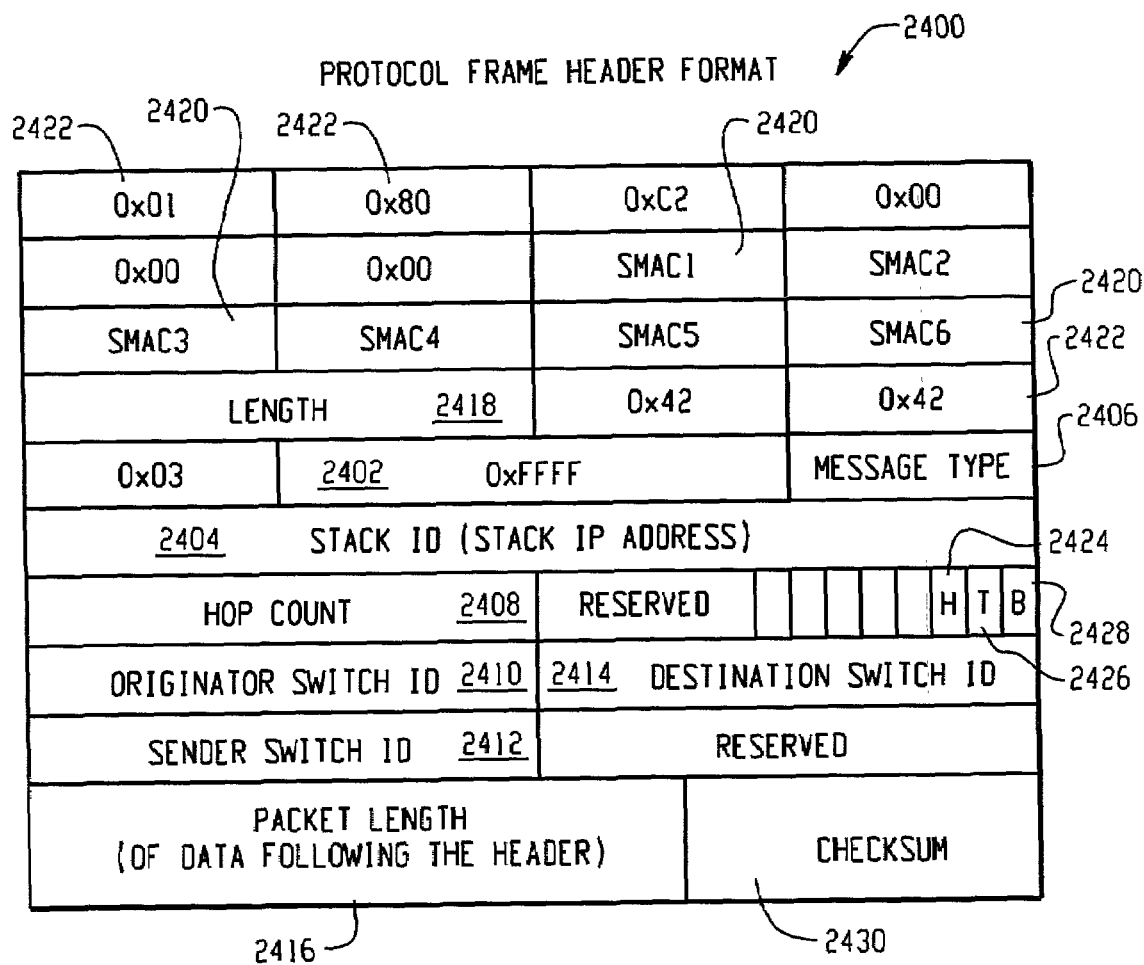
FIG. 24 illustrates a packet structure for a protocol frame header.

Referring now to FIG. 24, there is illustrated a packet structure of a protocol frame header 2400. The header 2400 contains the protocol ID field 2402 set to 0xFFFF, a stack ID field 2404, a message type field 2406 for indicating a variety of messages discussed hereinbelow, a hop count field 2408, an originator switch ID (SID) field 2410, a sender SID field 2412, a destination SID field 2414, a packet length field 2416, a length field 2418 which is the total length of the packet (in bytes), various SMACx fields 2420 which indicates the respective sender's MAC address, several fixed-value fields 2422 (e.g., 0x42 is a DSAP-destination or SSAP-source service access point, 0x03 indicates the LLC type-1 U1, etc.), a hop flag field (H_flag) 2424, a T_flag field 2426, a broadcast flag field (B_flag) 2428, and a checksum field 2430 for parity. Other unused fields exist or are reserved for future use.

When the broadcast flag (B_flag) is set to one, the destination switch ID is irrelevant. A received packet with B_flag set to one is passed to one of the protocol layers based upon the message type. If the protocol layer decides to forward the packet (e.g., the packet is not originated by the switch itself, and the content is new or has not been received in approximately the last five seconds), then the packet is forwarded to all stack ports, except the incoming port. It is assumed here that only those protocol layers existing in every stackable switch send packets with B_flag set to one.

The T_flag is the same as the B_flag, except that the packet is flooded along the stack tree. When the Stack Communication Layer 112 receives a non-self originated packet with the T_flag set to one, the packet is passed to the corresponding protocol layer. Additionally, the packet is forwarded to all stack ports in the forwarding state, except the incoming port.

The H_flag is the hop flag, and indicates only one hop. When the H_flag is set to one, the destination switch ID field is irrelevant. A packet with the H_flag set to one is not forwarded by the receiving switch. This flag is used in the Hello protocol 100.

The Message type field 2406 can indicate the following types: HELLO, TOPOLOGY_LSA, SDA_ADV, SDA_DEL, SDA_QUERY, ENCAPSULATED_BPDU, TCN, TCA, ROUTE_ADD, ROUTE_DEL, ROUTE_PURGE, EXT_VLAN_DOMAIN_STATUS, INTERFACE_STATUS, and STACK MANAGEMENT.

Hello Protocol

The Hello Protocol module 100 periodically sends "hello" packets through its configured stack ports to establish "adjacency" with the other switches in the same stack. Adjacency is a relationship formed between selected neighboring switches (or routers) in the same stack. Adjacency information includes the state of connectivity with neighbors and attributes of the neighboring switches, and which adjacency information is stored in an adjacency database. Adjacency is established when a switch receives a hello packet containing its configured stack ID, and acknowledges reception of the hello packet from the sending switch. The established adjacencies are advertised in the Topology Discovery and Master Election Protocol 102.

Figure 2:
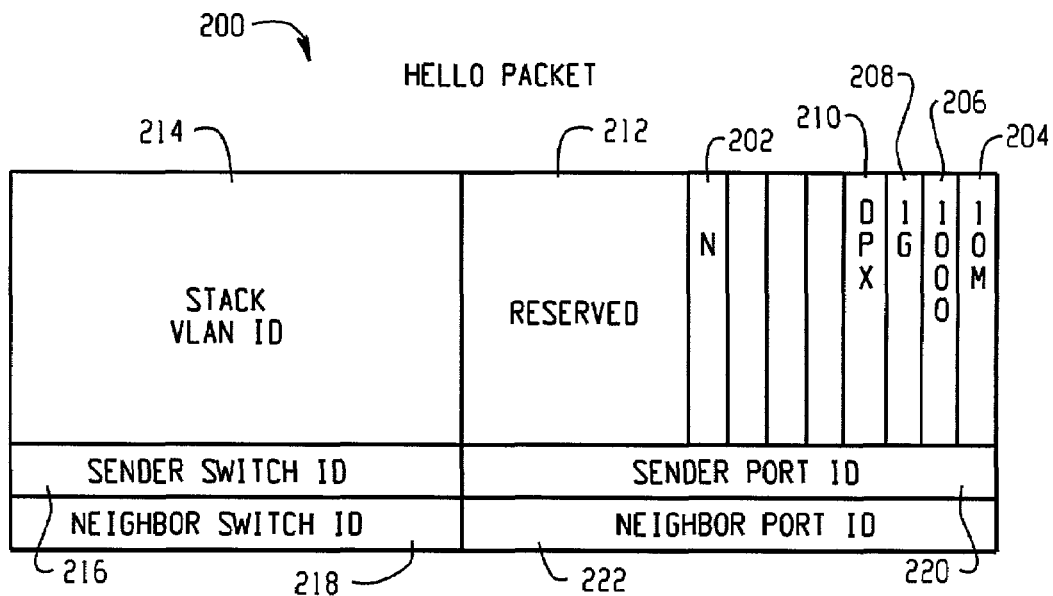
FIG. 2 illustrates a packet structure of a hello packet.

Referring to FIG. 2, there is illustrated a hello packet structure 200, in accordance with the hello protocol 100. As mentioned hereinabove, the hello protocol 100 is used to establish and maintain adjacency between switching nodes in the same stack. The packet 200 has several fields associated therewith: an N bit field 202, which is set to one when the Neighbor Switch ID and Neighbor Port ID are valid; a 10M field 204, which when set, indicates a 10 Mbit/sec port; a 100M field 206, which when set, indicates a 100 Mbit/sec port; a 1 G field 208, which when set, indicates a 1 Gbit/sec port; and a DPX field 210, which when set, indicates a full duplex mode port. There is also a reserved field 212, which can be used for special applications, a stack VLAN ID field 214, a Sender Switch ID field 216, which provides the identification number of the sending switch, a Neighbor Switch ID field 218, which provides the identification number of a neighbor port, a Sender Port ID 220, which provides the port identification of the sending switch, and a Neighbor Port ID 222, which provides the identification number for a neighbor port. The Hello protocol packet is sent with the following flags set in the protocol frame header 2400: B_flag=0, T_flag=0, and H_flag=1.

Figure 3:
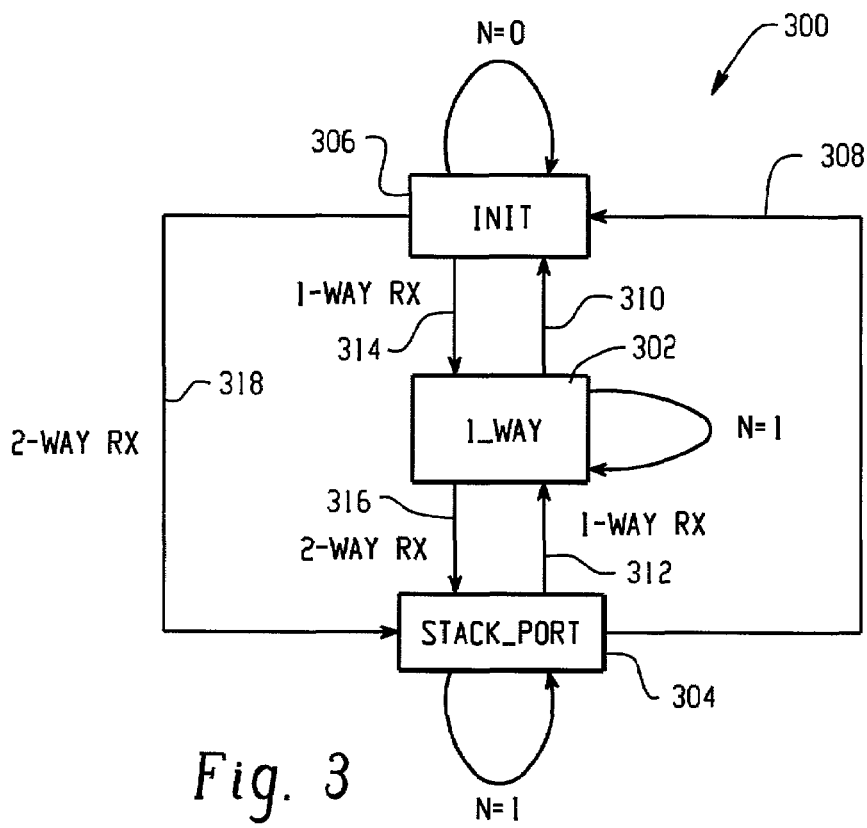
FIG. 3 illustrates a state diagram for the hello protocol.

Referring to FIG. 3, there is illustrated a state diagram 300 for the hello protocol 100. When a port is in the 1_way state 302, the hello protocol 100 sends hello packets with the N bit=1 at a rate of approximately one per second. When a port is in the stack_port state 304, the hello protocol 100 sends hello packets with the N bit=1, at a rate of one hello packet approximately every two seconds. When a port is in the Init state 306, the Hello protocol 100 sends hello packets with N bit=0 to try to establish adjacency, but at a rate of one packet approximately every ten seconds. The Hello protocol 100 transitions from the stack_port state 304 to the Init state 306 along a path 308 when one of three events occurs: the LLDown occurs (i.e., the port goes down), the inactivity timer expires, or these is an adjacency mismatch event (i.e., a hello packet is received with the N bit=1, and the Neighbor Switch ID does not equal my switch ID, or the Neighbor Switch ID does not equal my receiving port ID, or there is a speed/duplexity/stack VLAN ID mismatch). The same events occur along a path 310 when the hello protocol 100 transitions from the 1_way state to the Init state 306. A 1-way received event occurs (i.e., the hello protocol 100 receives a hello packet with the N bit=0) when transitioning from the stock_port state 304 along a path 312 to the 1_way state 302. Similarly, a 1-way received event occurs (i.e., the hello protocol 100 receives a hello packet with the N bit=0) when transitioning from the Init state 306 along a path 314 to the 1_way state 302. In addition to transitioning to the 1_way state, a hello packet with N bit=1 will be immediately sent out to the neighbor when a 1-way received event occurs. A 2-way received event occurs (i.e., receives a hello packet with N bit=1, Neighbor Switch ID=my switch ID, and neighbor port ID=my receiving port ID) when transitioning from both the 1-way state 302 along a path 316 to the stock_port state 304, and from the Init state 306 along a path 318 to the stock_port state 304.

Topology Discovery Protocol

A topology discovery protocol 102 is run on each switch. The protocol operates such that each switch in the stack of switches periodically advertises to all of the other switches in the stack, information associated with its discovered stack neighbors. The advertisement to each of its neighbors is in the form of a Link State Advertisement (LSA) which describes the switch adjacencies in the stack (i.e., "who are my neighbors"). When a switch receives an LSA, the packet is forwarded to its central processing unit (CPU). If the received LSA is not originated by the switch itself, and the LSA_seq_num in the packet is different from what is last received from the originator, the CPU forwards it to all stack ports, except the incoming port. A switching node will not immediately start building a new topology map after a new LSA is received, but waits for approximately five seconds. This limits the rate of updates to the topology map and provides sufficient time for the switching node to collect the other LSAs during a major topology change. When another switch in the same stack receives the LSA, it will again forward the LSA to its neighbors. Whenever a port is in the stack_port state 304, the Topology Discovery protocol 102 advertises the link between these two neighbors. After a transition into or out of the stack_port state 304, the Topology Discovery protocol 102 is triggered to immediately send a new advertisement, and is then scheduled to compute a new topology map. Thus, based upon the received LSAs, a switching node builds a topology map. Each switch in the stack develops a complete topology map of the current stack topology, and as a result of the advertising, each switch in the stack has an exact copy of the topology map. The topology Discovery protocol 102 maintains a link state database for preserving the stack topology.

An LSA will be included in a node X topology map if there exists a path from X to the originator of the LSA, using the received LSAs. If an LSA is not included in the topology map, it is purged approximately thirty seconds after the topology map is built. A switching node will not finish building a topology map until the map is "complete." A topology map is complete if, and only if, the following is true: if the LSA of node X is included in the map, and X advertises adjacency to Y, then the LSA of node Y is also in the map, and Y advertises adjacency to X.

Figure 4:
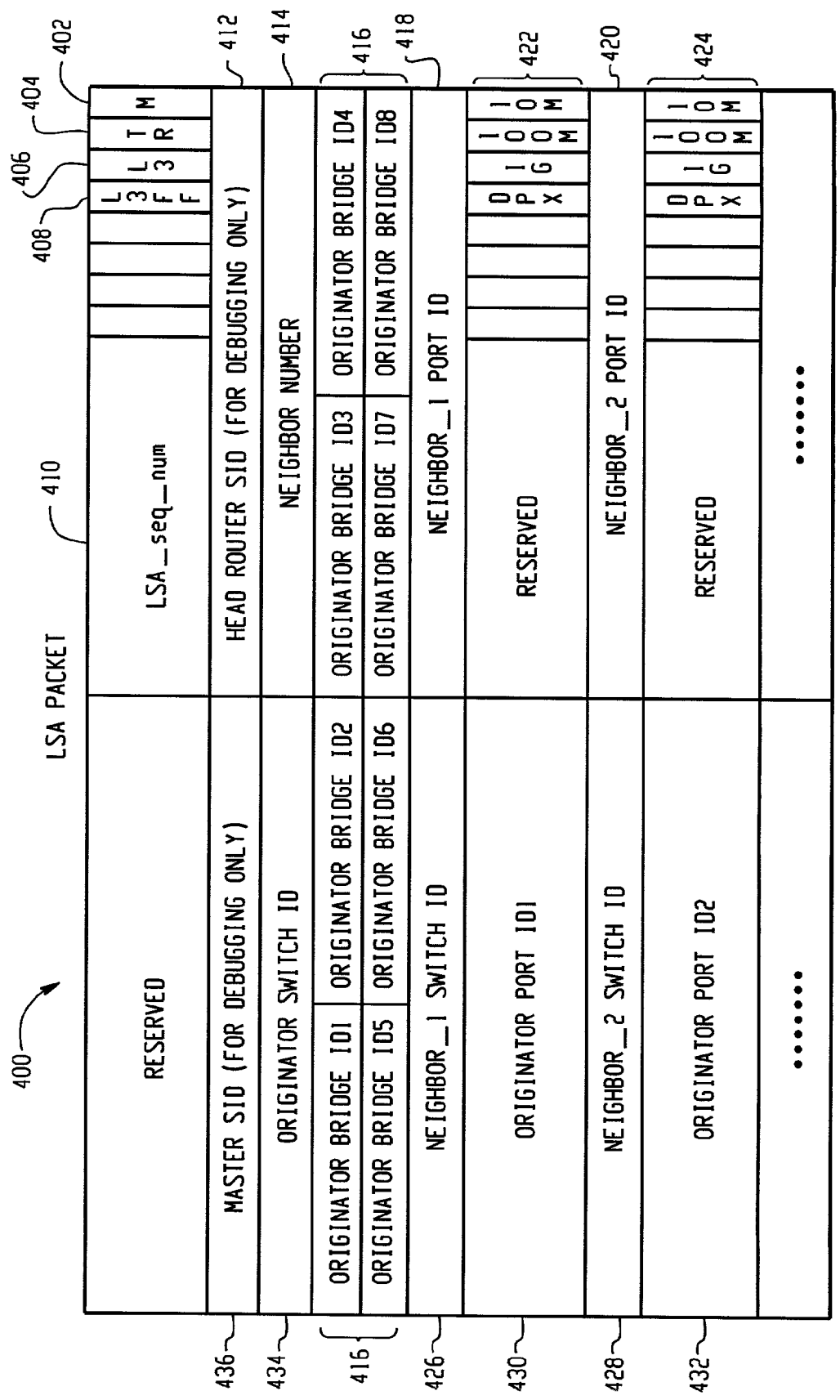
FIG. 4 illustrates a packet structure for an LSA packet.

Referring now to FIG. 4, there is illustrated a structure of an LSA packet 400, according to a disclosed embodiment. Some of the more significant fields include the following: an M_flag field 402 is included, and is set when a switch declares itself the master; a TR_flag field 404 which indicates a topology request; an L3_flag field 406 which indicates that the switch originating the message is a Layer 3 switch; an L3_FF flag field 408 which indicates whether the switch originating the message has a routing table which is in sync with the master; an LSA_seq_num field 410 which indicates the sequence number of the LSA packet; a head router SID field 412 which is used for debugging purposes; a neighbor number field 414; several 8-byte originating bridge ID number fields 416 (i.e., Originator Bridge IDs 1–8) for identifying the bridge which is sending the message; neighbor port ID fields 418 and 420 for identifying stack ports of neighbors; corresponding bandwidth and mode fields 422 and 424 for the neighbor port ID fields; neighbor switch ID fields 426 and 428 for identifying the neighboring stack switches; originator port ID fields 430 and 432 for indicating the port identifiers of the originating switch; an originator switch ID field 434 for indicating the identifier of the originating switch; and a master SID field 436 used for debugging purposes. When a switch broadcasts an LSA packet, it uses an LSA_seq_num which is one, plus the LSA_seq_num used in the last broadcast LSA packet. The LSA_seq_num is used to prevent LSA packets from looping, in case physical loops exist in the stack topology.

Master Election Protocol

Election of the master is accomplished in accordance with the Master Election protocol 102. The master takes over the stack IP address, and stack-wide management can be accomplished through the master using the stack IP address. The master IP address is always retained by the working master. If the current master goes down, the new elected master automatically assumes the same IP address. The master is elected based upon the topology map as follows. According to a first rule, if there exists an L3-capable switching node in the topology map, elect the L3-capable switching node with the smallest switch ID as the master. Otherwise, elect the switching node with the smallest switch ID, as the master. According to a second rule, to ensure that the master will not be re-elected unless the current master goes down, or the current master is not an L3-capable switch, and an L3-capable switch joins the stack, the following scheme can be used. When a switching node joins a stack, initially it sets the M_flag to zero in the LSA which it advertises. After the L3-capable switch obtains a complete topology map, it sets the M_flag in its LSA to one, and takes the master role, if the following is true: no switch declares to be the master, and it is the master according to the first rule, or it is an L3-capable switch and the current master is not an L3 switch. Otherwise, it takes a slave role.

If more than one switch declares to be the master (e.g. two partitions of a stack join together), the first rule is used to resolve the tie. The switch which fails to become the master will immediately change its role to be a slave (i.e., reset M_flag=0 in its LSA).

A switching node determines the master as follows: if no switch declares to be the master, use the first rule to make the decision. Otherwise, if more than one switch declares to be the master, use the first rule to resolve the tie. If no tie, choose the switch declaring to be the master.

After a switching node computes a new stack tree, it cleans up its switching database as follows: if switch X no longer exists in the stack tree, all database entries originated by switch X are deleted (in the remote database, local database, and SRAM database). If the outgoing port associated with switch X changes, all database entries originated by switch X are deleted (in the remote database, local database, and SRAM database). The stack tree is structure such that high capacity ports are on (or towards) the top and low capacity ports are on (or towards) the bottom.

To ensure that each switching node LSA is received by all the other switching nodes (so that every node has the same topology map), a switching node periodically advertises its LSA (one advertisement approximately every ten seconds). LSA packets are sent with the following flags in the protocol frame header 2400: H_flag=T_flag=0,B_flag=1.

Note that an L3-capable switch does not set the L3_flag in its LSA until its stackwide configuration and routing table are in sync with the current master. If no master exists when it joins the stack, then the L3-capable switch can immediately set its L3_flag in its associated LSA.

A switching node may run in one of two modes: standalone mode or stacking mode. If the switching node is configured to run in a stack and more than half of the stack nodes are in its topology map, it runs in stacking mode, otherwise, it runs in standalone mode. When running in the stacking mode, each switch builds a tree rooted at the master, and based upon the topology map.

The elected master switch handles all SNMP (Simple Network Management Protocol) packets sent from the management station and also runs the routing protocol, if the routing function is to be provided. This provides a single point of management, as the SNMP agent 118 only needs to communicate with one switch-the elected master of the stack. The elected master forwards the commands to the other stack switches (i.e., the slaves). Having an elected master operational at all times eliminates a single-point-of-failure problem in conventional stack configurations. The SNMP agent 118 can always communicate with a stack master. Where there is a tie in switch IDs of a Layer 2 switch and a Layer 3 switch, the Layer 2 switch has priority as master.

Stack Tree Construction

Based upon a complete topology map, each switch independently builds a minimal cost spanning tree (i.e., a stack tree) using a minimal cost spanning tree algorithm, and elects a master switch based upon the topology map. The stack tree is a loop-free topology that encompasses all of its parts (or leafs), consequently, it breaks all loops in the stack topology. The cost associated with each link is the inverse of the port speed, i.e., 1/(port speed). In case there exists more than one equal-cost links, the following scheme can be used to resolve a tie. Given two equal-cost links, <x1,y1> and <x2,y2>, where x1, y1, x2, y2 are switch IDs, and x1<y1 and x2<y2, link <x1,y1> will be selected, if x1<x2, or x1=x2 and y1<y2. When a switch X has multiple links connected to another switch Y, then switch X only advertises the link with the lowest cost. If more than one link has the lowest cost, ties are resolved as follows: if x<y, then compare switch X port IDs associated with the links, and advertise the link with the smallest port ID. Note that 802.3ad trunk ports are considered as a single port, in this application.

Spanning Tree Protocol

The standard STP, with some minor modifications, is run at each of the switching nodes. The STP running at a switching node determines the STP states of its own non-stack ports. A switching node uses its stack tree to determine the STP state of each stack port. A stack port is in the forwarding state if it is one of the end points (or leafs) of a tree branch link. Otherwise, it will be in the blocking state. The STP states of non-stack ports is determined by the STP. When the topology of the stack changes, stack ports may change from the blocking state to the forwarding state, and vice versa. To minimize the possibility of temporary loops within the stack, a stack port can not be moved to the forwarding state until at least fifteen seconds after a new topology map is computed.

The STP running at a switching node determines the STP states of its own non-stack ports as follows. Initially, a switching node runs with its own bridge ID. After it has learned the ID of the master, it runs with the master bridge ID, and renumber its spanning tree port IDs starting from switch_ID (MAX_PORT_PER_SWITCH). When a BPDU is received (either forwarded by another switching node or sent by a switch not in the stack), it forwards the BPDU unchanged (same root path cost, same transmitter) to all stack ports in the forwarding state (except possibly the incoming port). These modifications ensure that every switching node receives the same set of BPDUs. When two BPDUs with the same root bridge ID, root path cost, and originator ID are received, standard STP determines the root port based upon the receiving port ID and the corresponding path costs. To perform similar root port tie-breaking in a stack, the following is done: encapsulate a BPDU received from a non-stack port into a frame containing its switch ID, inbound port ID, and path cost of the receiving port (inbound_path_cost), and forward the frame to every stack port in the forwarding state; and, root port tie-breaking between two ports is based upon the switch IDs, port IDs, and inbound path costs (inbound_path_cost) in the encapsulated BPDUs received from the ports.

When the master is down, the slaves continue running with the old master bridge ID until a new master is elected. Therefore, for switches external to the stack, crash of the stack master will appear as if a few ports are down (i.e., if the stack is the root of the STP tree, crash of the master will be seen as the root switch being down). Note that link up/down events at a stack port do not cause an STP topology change notification (TCN) message to be sent unless the event causes a switching node to appear/disappear in the stack tree. The last option does not have the issues associated with the other two options, and is easiest to make a transition between a master role and a slave role, with minor code changes in the STP.

STP Stack Interface (SSI)

The SSI (STP Stack Interface) module 104 and the STP (Spanning Tree Protocol) module determine the STP states of the non-stack ports. The STP states of the stack ports are determined by the Topology Discovery protocol 102. The SSI module 104 makes a stack of switches behave externally as a single switch as far as the spanning tree protocol is concerned. One function of the SSI module 104 is to ensure that each switch in the stack sets its Bridge ID to that of the master, after the master is elected. The SSI module 104 sits between the STP Protocol module 106 and the driver 124, and performs the following functions. When stacking is disabled, the SSI module 104 will do nothing but pass messages between the STP module and the driver 124. The SSI module 104 sends a VS_STP_SET_BRIDGE_ID message to the STP module to change the bridge ID to that of the master, when the master is elected. When stacking is disabled, the SSI module 104 sends a VS_STP_SET_BRIDGE_ID message to change the bridge ID to that of its own bridge ID. The SSI module 104 also functions to send a VS_STP_SET_PORT_ID message to change the port ID when stacking is enabled or disabled. When stacking is enabled, physical port x is assigned an ID of x+(switch_id <<8). When stacking is disabled, physical port x is assigned an ID of x +(port_priority <<8).

BPDU Forwarding

The SSI module 104 also performs BPDU (Bridge Protocol Data Unit) forwarding. When the SSI module 104 receives a BPDU from a non-stacking port, it passes the packet up to the STP module. In addition, it checks if the BPDU is sent by one of the switches in the stack. If not, it checks with the STP module to find out if the information carried in the BPDU packet supersedes the information recorded for the port by calling supersedes_port_info( ). If the result is true and the receiving port is not stp_disabled, the BPDU is forwarded unchanged, but encapsulated in the packet with the inbound switch ID, inbound port ID, and inbound_path_cost, to all stack ports in the forwarding state. The inbound path cost is set to the path cost of the non-stack port that receives the BPDU.

Figure 5:
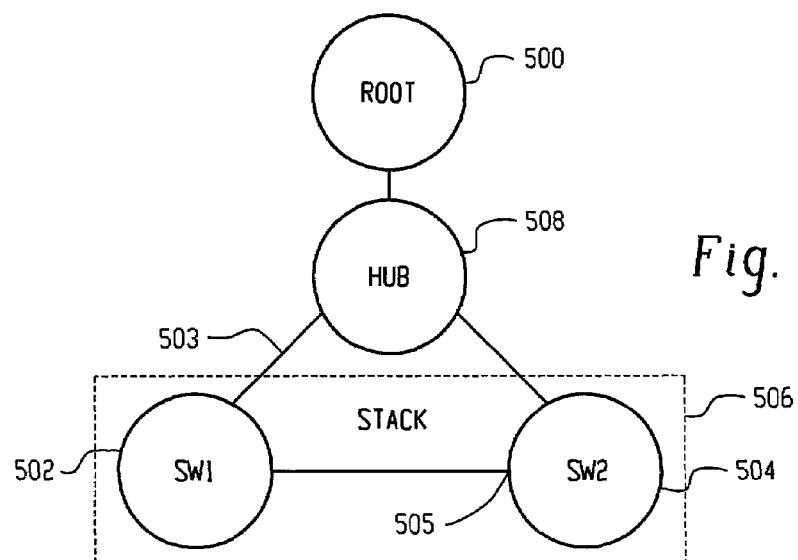
FIG. 5 illustrates a block diagram of a root port tie-break scenario where it is necessary to pass the inbound switch ID to the STP module.

Referring now to FIG. 5, there is illustrated a block diagram of a root port tie-breaking scenario where it is necessary to pass the inbound switch ID and inbound port ID to the STP module. In a root port tie-break scenario, when a root 500 sends a BPDU, both switches 502 and 504 in the stack 506 each receive two copies of the same BPDU. The switches 502 and 504 use the inbound switch ID and the inbound port ID to determine the root port.

Assuming the path costs of the stack ports are one and the path costs of the non-stack ports are ten, switch 502 and switch 504 have the following STP port states:

Switch 1: root bridge id=root id
  Port 1: designated cost=0
    inbound_path_cost=10
    designated bridge=root id
    designated port=x
    inbound_stacking_pid=<sid=1, pid=1>
  Port 2: designated cost=0
    inbound_path_cost=10
    designated bridge=root id
    designated port=x
    inbound_stacking_pid=<sid=2, pid=1>
Switch 2: root bridge id=root id
  Port 1: designated cost=0
    inbound_path_cost=10
    designated bridge=root id
    designated port=x
    inbound_stacking_pid=<sid=2, pid=1>
  Port 2: designated cost=0
    inbound_path_cost=10
    designated bridge=root id
    designated port=x
    inbound_stacking_pid=<sid=1, pid=1>

Based upon this port state information, switch 502 chooses its port 503 as the root port, and switch 504 chooses its port 505 as the root port.

Figure 6:
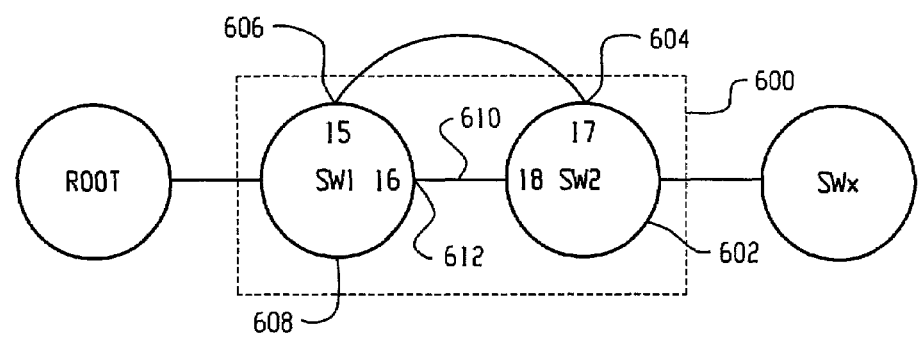
FIG. 6 illustrates a block diagram of a scenario where the BPDU packet received from a non-stack port with the stack Bridge ID should not be forwarded to the other switches in the stack.

Referring now to FIG. 6, there is illustrated a block diagram of a network configuration where the BPDU packet received from a non-stack port with the stack Bridge ID should not be forwarded to the other switches in the stack 600. If a switch 602 forwards the BPDU packet which was received at its port 604 (i.e., port 17) from port 606 (i.e., port 15) of switch 608, back to switch 608 along a path 610, switch 608 determines that its port 612 (i.e., port 16) is not a designated port (since the value 15 is less than 16). This causes TCN packets to be ignored by the STP module when received at port 612. When the SSI module 104 receives an encapsulated BPDU from a stacking port which is in the forwarding state, the SSI module 104 removes the encapsulation, and passes the packet to the STP module along with the inbound switch ID, inbound port ID, and inbound path cost in the encapsulation. In addition, the SSI module 104 forwards the encapsulated packet to every stack port which is in the forwarding state (except the receiving port). Note that TCN messages received from a stack port or a non-stack port are passed to the STP module, only, and are not forwarded.

BPDU Filtering

Figure 7:
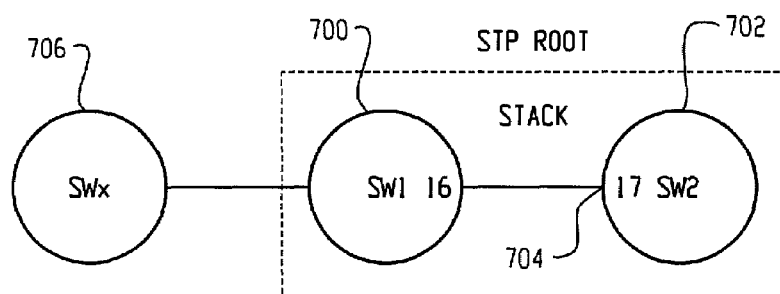
FIG. 7 illustrates a block diagram of a scenario for BPDU filtering.

The SSI module 104 also performs BPDU filtering by filtering out BPDU packets originated by its STP module 106 toward a stack port. Referring now to FIG. 7, there is illustrated a block diagram of a scenario for SSI module 104 BPDU filtering. In FIG. 7, if switch 700 originates and sends BPDU packets toward switch 702, switch 702 "believes" that its port 704 (i.e., port 17) is not a designated port. When a topology change occurs at switch 706, and switch 700 notifies switch 702 of the topology change via a TCN packet, the TCN packet is ignored by STP module of the switch 702.

The SSI module 104 also filters VDL_PORT_STATE_CHG_REQ messages sent from the STP module are to the driver 124 to configure STP port states in hardware. When the message is sent against a non-stack port or when stacking is disabled, the message is passed down to the driver 124. Otherwise, the message will be filtered out.

When stacking is changed from enabled to disabled, the SSI module 104 sends a VS_STP_SET_BRIDGE_ID message to change the bridge ID back to that of its own bridge ID, sends VS_STP_SET_PORT_ID messages to change the port ID of each of its ports, and sends a VS_STP_RESTART message to the STP module (upon receiving this message, the STP module calls stp_initialization ( ) to restart the STP on the switch), and sends a VS_STP_TRIGGER_TOPOLO-GY_CHG message up to the STP module to initiate a topology change event.

When a port is changed from a stack port to a non-stack, the SSI module 104 sends a VS_STP_TRIGGER_TO-POLOGY_CHG message up to the STP module to initiate a topology change event, and sends a VS_STP_PORT_RE-START message to the STP module. Upon receiving this restart message, the STP module, (1) calls initialize_port( ) to restart the STP on the port, (2) calls configuration_update( ) to select the root port and the designated ports, and (3) calls port_state_selection( ) to compute the STP state of every port.

Topology Change Handling

The SSI module 104 also performs topology change handling. The STP module sends a TCN packet toward the root switch when an STP port state change occurs. When the TCN packet is received, the SSI module 104 passes the TCN packet to the STP module. If the TCN packet is received from a port that is the designated port on its attached segment, the STP module in turn calls topology_change_detection( ) to initiate a topology change event, and sends a BPDU packet from the receiving port, with a topology change acknowledgment flag set to one, to acknowledge receiving the TCN packet.

When a stack port is changed from the forwarding state to the blocking state, or vice versa, the SSI module 104 sends a VS_STP_TRIGGER_TOPOLOGY_CHG message up to the STP module. Upon receiving this message, the STP module calls topology_change_detection( ) to initiate a topology change event.

For the STP root switch, topology_change_detection( ) causes BPDUs sent from the switch to have the TCN flag set to one for a period of time equal to approximately the sum of the forward delay and the maximum age. If it is not the STP root, topology_change_detection( ) initiates a TCN message toward the root.

When the stack is not the STP root, topology change handling is performed as follows in the SSI module 104. Topology change events are propagated toward the root. When the STP module 104 sends a TCN packet through a stack port, the SSI module 104 encapsulates the TCN into a proprietary TCN packet, and sends the proprietary TCN packet. When a switch receives a proprietary TCN packet from a stack port in the forwarding state, it sends back a proprietary Topology Change Acknowledgment (TCA) packet, forwards the TCN packet to the root port, and starts the TCA timer. The forwarded TCN packet is encapsulated if and only if the root port is a stack port. When the SSI module 104 receives a TCA packet from a stack port in the forwarding state, and the TCA timer is active, it will stop the TCA timer.

When the SSI module 104 receives a TCA packet from a stack port in the forwarding state and the TCA timer is not active, it determines the receiving port's designated bridge ID, designated port ID, designated root path cost, age, etc., determines the topology change status in the switch and uses it as the topology change flag in the forged BPDU, and passes it to the STP module 106 with the forged BPDU that has the TCA flag set to one.

When the TCA timer times out, it restarts the TCA timer and sends another TCN packet toward the STP root.

When the SSI module 104 receives a BPDU with the TCA flag set to one, it passes the packet to the STP module 106, stops the TCA timer, and resets the flag to zero before forwarding the BPDU to the other switches in the stack.

When the root starts sending BPDU packets with the TCN flag set to one, every switch in the path between the root and the stack is notified of the topology change, one by one. Eventually, when one of the switches in the stack receives a BPDU packet with the TCN flag set, it forwards the BPDU to all other switches in the stack. The received BPDU packet is then passed to the STP module, which in turn starts sending BPDU packets with the TCN flag set to one.

When the root resets the TCN flag in its BPDU packets, the same sequence as above occurs, except that BPDU packets are sent with the TCN flag reset to zero.

Figure 8:
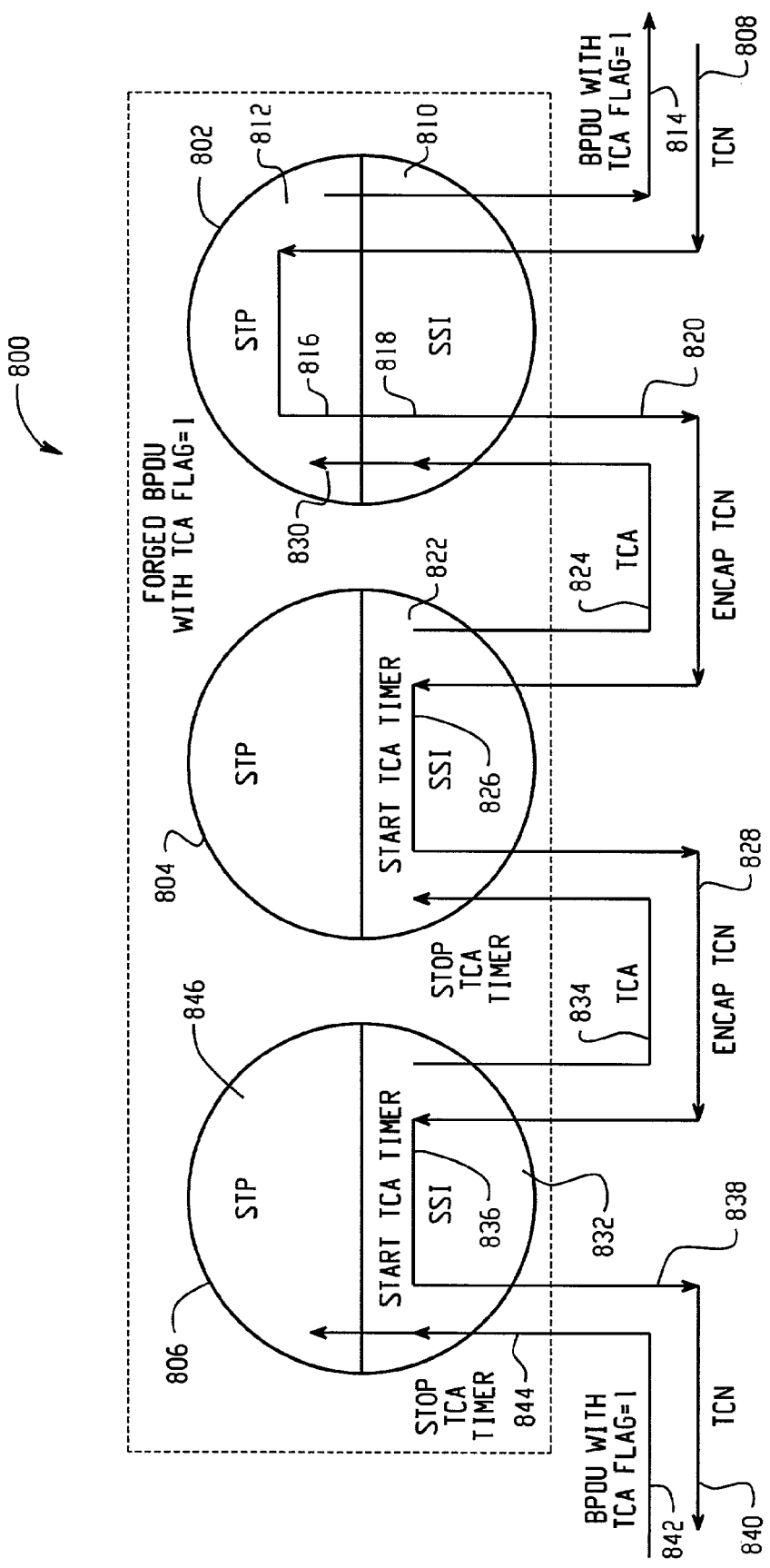
FIG. 8 illustrates a block diagram of topology change handling in a non-root scenario.

Referring now to FIG. 8, there is illustrated a block diagram of non-root topology change handling, according to a disclosed embodiment. It shows how topology change events are propagated toward a root across a stack 800. The stack 800 consists of three stack switches: switch 802, switch 804, and switch 806. When stack switch 802 receives a TCN packet along a path 808 from an external switch (not shown), the packet is passed by an SSI module 810 of switch 802 (similar to SSI module 104) up to an STP module 812 of switch 802 (similar to STP module 106). The STP module 812 acknowledges the TCN by sending back to the external switch (along a path 814) a BPDU with TCA flag set to one. In addition, the STP module 812 propagates a topology change notification toward the root along a path 816, and sends a TCN packet down to the SSI module 810. When SSI module 810 receives the TCN packet from the STP module 812, it encapsulates the TCN packet into a proprietary TCN packet (denoted at a point 818), and forwards it toward the root along a path 820. When an SSI module 822 of switch 804 receives the proprietary TCN packet from switch 802, it sends back a proprietary TCA packet along a path 824, starts a TCA timer (denoted at a point 826), and forwards the proprietary TCN packet to switch 806 along a path 828. When the SSI module 810 of switch 802 receives the proprietary TCA from switch 804, it sends up to the STP module 812 a forged BPDU that has the TCA flag set to one, as denoted at a point 830.

When an SSI module 832 of switch 806 receives the proprietary TCN packet from switch 804, it sends back a proprietary TCA packet along a path 834, starts a TCA timer (denoted at a point 836), and forwards the TCN packet, de-encapsulated, out of the stack 800 along a path 838 to another switch (not shown) through non-stack port 840. When the SSI module 832 of switch 806 receives from the external switch a BPDU with TCA flag set to one, as indicated at a point 842, it stops the TCA timer (denoted at point 836), passes the BPDU to an STP module 846 of switch 806, and forwards the BPDU to the other switches (804 and 802) in the stack 800 after resetting the TCA flag to zero.

When the stack 800 is the STP root, and a switch in the stack detects or is notified of a topology change, the switch notifies the other stack switches of the topology change. When the STP module is notified of a topology change event, it starts sending BPDU packets with the TCN flag set to one, for a period which is equal to the sum of the forward delay and the maximum age. Propagation of topology change events within the stack is accomplished as follows. When a switch is the STP root, it sends the TCN packet to each of the other switches in the stack for notification of a topology change, when one of the following events occurs: (1) a TCN packet is received from a non-stack port in the forwarding state, (2) a stack port makes an STP state transition, or (3) a non-stack port makes an STP state transition. In addition, the STP root switch sets tca_received[] to zero and starts the tca_root timer.

When a proprietary TCA packet is received from a stack port in the forwarding state, it checks if it is the STP root, and if the tca_root timer is active. If so, it sets the corresponding entry in tca_received[] to one. If every switch existing in the topology map has its entry in tca_received[] set to one (except itself), the tca_root timer is stopped, if it is active. When the tca_root timer times out, it checks if it is the STP root. If so, it sets tca_received[] to zero, sends another TCN packet to each of the switches in the topology map, and restarts the tca_root timer.

Figure 9:
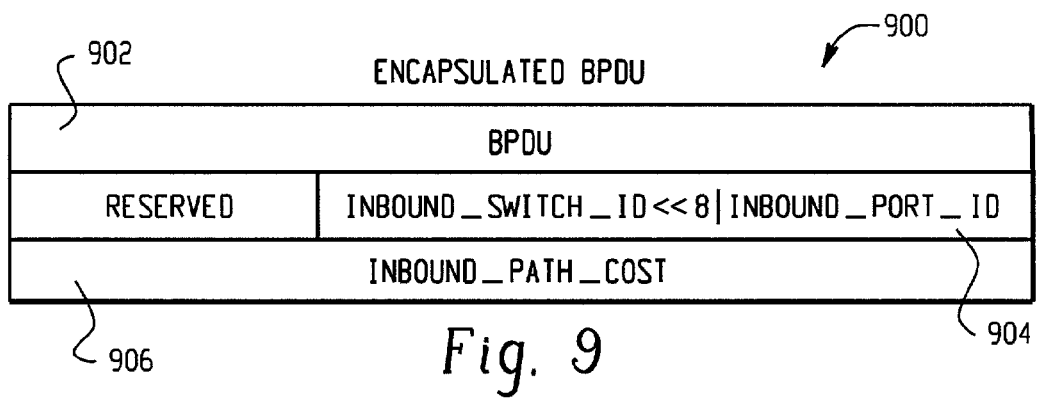
FIG. 9 illustrates a packet structure for an encapsulated BPDU.

Referring now to FIG. 9, there is illustrated a packet structure 900 for an encapsulated BPDU. The packet 900 comprises a BPDU field 902, an inbound switch and port ID field 904, and an inbound path cost field 906.

Figure 10:
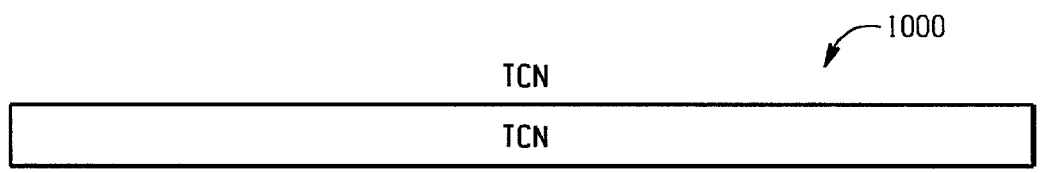
FIG. 10 illustrates a topology change notification packet.

Referring now to FIG. 10, there is illustrated a packet structure 1000 for a TCN message. The TCN packet 1000 contains the common protocol header 2400 and has the TCN message of the STP protocol in the body. The TCA packet (not shown) has only the common protocol header 2400.

Stack Management Protocol

The switch stack management protocol 108 is responsible for the distribution of switch configurations and retrieval of switch status/configurations. There are two types of configurations: (1) per switch configurations are specific to a switch, e.g., port speed/duplexity, port VLAN ID, etc., and (2) stack-wide configurations, which are global to the whole stack, e.g., stack IP address, STP configurations, GVRP (GARP VLAN Registration Protocol, where GARP is Generic Attribute Registration Protocol) enabled/disabled, IGMP (Internet Group Management Protocol) snooping enabled/disabled, etc. Each switch stores stack-wide configuration and its switch specific configuration in flash memory. After the master is elected, it distributes stack-wide configurations to every slave. If a slave's stack-wide configurations (which are stored in its flash memory) are different from the master's copy, the master's copy is used to overwrite the slave's copy in the flash memory. When the master receives a configuration command from the management station or the console interface, it distributes the configuration to every slave, if global, or distributes the configuration to a slave, if it is switch-specific. When the master receives a retrieve request from the management station or the console interface, which request is specific to a switch, it sends a retrieve request to the slave, which then sends a response back to the master. When there is a status change in a slave, it sends a status change notification to the master, which then notifies the management station or the console interface. A timeout/retry/acknowledgment mechanism is built inside the protocol.

The stack management protocol 108 is responsible for bringing up a switch joining the stack. The joining process may be initiated by the master, or by the slave itself. If the master initiates the process, it sends an invite message to the slave. If the slave initiates the process, it sends a join message to the master, which responds with an invite message back to slave. When the slave receives an invite message from the master, it responds with an accept_invite message back to the master. After the master receives the accept_invite message, it starts sending all stack-wide configurations to the slave.

Figure 11:
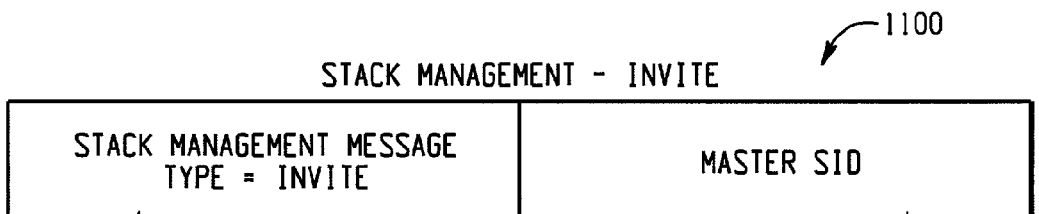
FIG. 11 illustrates a packet structure for a stack management invite message.

Referring now to FIG. 11, there is illustrated a packet structure for a stack management invite message 1100. The message 1100 comprises two fields; an invite type field 1102, and a master SID field 1104.

Figure 12:
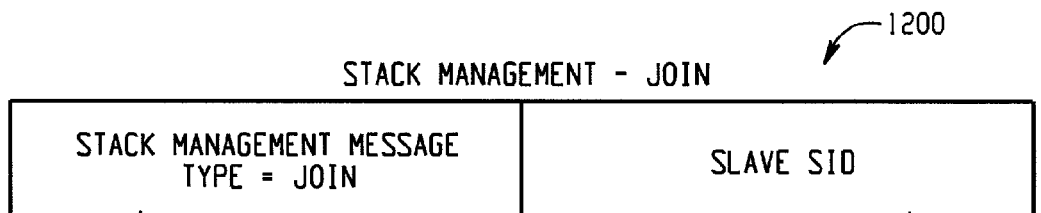
FIG. 12 illustrates a packet structure for a stack management join message.

Referring now to FIG. 12, there is illustrated a packet structure for a stack management join message 1200. The message 1200 comprises two fields; a join type field 1202, and a slave SID field 1204.

Figure 13:
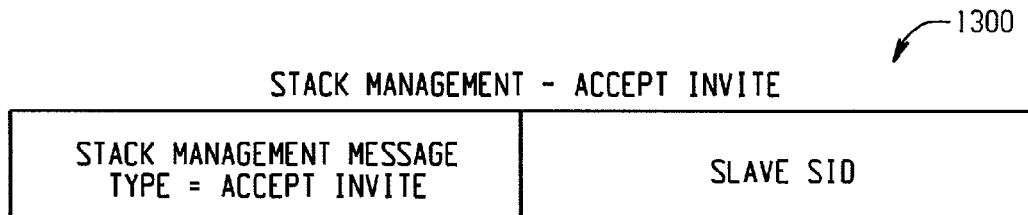
FIG. 13 illustrates a packet structure for a stack management accept invite message.

Referring now to FIG. 13, there is illustrated a packet structure for a stack management accept invite message 1300. The message 1300 comprises two fields; an accept invite type field 1302, and a slave SID field 1304.

When a slave joins the stack, it waits for approximately two seconds before sending a join message to master. In case the master and the slave initiate the joining process simultaneously, the master ignores the join message from the slave.

GVRP (GARP VLAN Registration Protocol)

The standard GVRP protocol is running independently at each switching node, and results in each switching node independently determining its own VLAN domain for each VLAN. GVRP is always enabled on all stack ports. Stack-wide GVRP configuration will only enable/disable GVRP on non-stack ports. A new GARP API is needed to notify GARP/GVRP when a port is moved into/out of the stack_port state.

Switching Database Synchronization Module

The software switching database consists of a local switching database and a remote switching database. The local switching database (LSD) is for MAC (Media Access Control) addresses which are learned locally. The remote switching database (RSD) is for MAC addresses learned at another switching node and advertised to this node through switching database synchronization. The RSD consists of two components: (1) a database structurally similar to the local database, but instead, the switch ID is used instead of port ID, and (2) a switch ID table containing switch IDs of switching nodes in the stack tree and the corresponding ports utilized to reach the nodes.

The remote switching databases are loosely synchronized. When an unknown unicast packet is received, hardware/firmware 126 floods the packet to all ports and periodically sends a query to software. If the entry exists in the RSD, software sends a response to firmware 126, which creates the entry in hardware memory (e.g., static RAM or SRAM). Otherwise, software broadcasts the query to the stack, which broadcast propagates along the stack tree. The switching node with the entry learned from a non-stack port in its local switching database, then re-advertises the entry. Switching database synchronization is accomplished by informing the other switching nodes of newly created/deleted local database entries through the protocol. Packets sent for database synchronization are propagated along the stack tree. A database synchronization packet contains commands in the form of query, create, and delete, <VLAN id, MAC>, and switch ID.

After a database entry is learned locally from a non-stack port, it is advertised to every switching node. This ensures that port changes from one switching node to another (remote port change) causes switching database updates at every node. Local port changes do not need to be advertised. Note that a switching database entry may be learned both locally from a stack port, and also learned via advertising from a remote node. In this case, software ensures that the port ID in the local database entry is the same as the outgoing port to reach the originator of the remote entry. If the Port IDs are inconsistent, software will keep the new one and delete the old one (based upon a time stamp). If the Port IDs are consistent, one copy is kept at the LSD and another copy at the RSD so that each copy can be aged independently.

For example, hardware/firmware 126 ages out switching database entries in the SRAM at its own discretion. When a database entry is aged out, firmware 126 sends notification to software. After receiving a delete command from hardware/firmware 126, software removes the entry from the local database (but not the remote database). If the deleted entry was learned locally from a non-stack port, a delete message is broadcast to inform other nodes, which are storing the same entry, to delete the entry. Software ages out entries in the RSD at its own discretion. Software informs firmware 126 to delete the entry after a remote entry is aged out and the corresponding entry does not exist in its LSD. When a delete message is received from the originator, the entry is deleted from both the RSD and the LSD.

When a switching node learns a new database entry locally, it advertises the entry upward to the master by originating a switching database advertisement message (SDA_ADV). When a switching node ages out a locally learned database entry, it originates a switching database delete message (SDA_DEL) upward to the master. The protocol frame header 2400 of upward SDA_ADV and SDA_DEL messages has the originator switch ID set to the identifier of the advertising switch, the destination switch ID set to the identifier of the master, and has the following set of flags: H_flag =B_flag=T_flag=0. When a switching node receives an upward SDA, it forwards the SDA upward toward the master. When the SDA reaches the master, the master sends it downward.

The protocol frame header 2400 of downward SDA_ADV and SDA_DEL messages has the originator switch ID set to the identifier of the master, and has the following set of flags: H_flag=B_flag=0, T_flag=1. When a switching node receives a downward SDA, it updates its switching database and forwards the SDA downward. The relative order in which SDAs are received by the master determines the winner (the last one received) in case more than one switch advertises the same <VLAN, MAC> simultaneously.

When a switch wants to query the other switches for <VLAN, MAC>, it broadcasts a switching database query message (SDA_QUERY). The protocol frame header 2400 of the SDA_QUERY has the originator switch ID set to the querior, and has the following set of flags: H_flag=B_flag=0, T_flag=1. When a switch receives an SDA_QUERY, it looks up <VLAN, MAC> in its local database. If the entry exists, it originates an SDA_ADV packet upward to the master.

Figure 14:
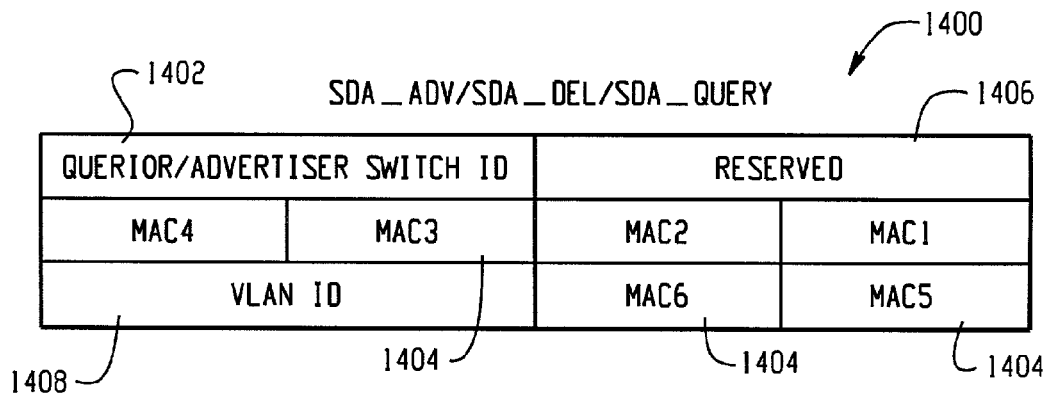
FIG. 14 illustrates a packet structure for a switching database synchronization protocol message.

Referring now to FIG. 14, there is illustrated a packet structure for a switching database message 1400. The message 1400 comprises a querior/advertiser switch ID field 1402, a plurality of MACx address fields 1404, a reserved field 1406, and a VLAN ID field 1408.

Stack Communication Layer

The Stack Communication Layer software module 112 is implemented at the bottom of the stacking software suite to transfer packets within the stack. Each protocol (Hello protocol 100, Topology Discovery protocol 102, etc.) utilizes the Stack Communication Layer 112 to send packets to other switches in the stack. This software layer functions to encapsulate/de-encapsulate protocol data with a common header 2400, provides multiple styles of data transfer (i.e., single destination, flooding, single-copy flooding along the stack tree), and demultiplexing. The Stack Communication Layer 112 searches the switch ID table to determine the outgoing port for sending (and forwarding) packets to other switching nodes in the stack. A switching node on the path to the destination of a packet performs the following. If the hop-count equals a predetermined parameter (e.g., MAX_HOP_COUNT), or the packet is originated by the switch itself, the packet is dropped. Otherwise, the switch ID table is searched to determine the outgoing port. If the outgoing port is the same as the incoming port, the packet is dropped. The hop count is then incremented, and the packet is sent through the outgoing port.

Data transfer through the Stack Communication Layer 112 is by "best-effort" only. If more reliable transfer is required in a protocol layer, it should implement a timeout/retry/acknowledgment mechanism.

Route Synchronization Module

"Software routing tables are fully synchronized utilizing the routing synchronization module 114. Routing protocols (e.g., RIP, OSPF, etc.) will run only at the master, which enable its RIP/OSPF interfaces for transmitting and receiving. Whenever there is a routing table update, the master synchronizes the update with the slaves.

When the TCP/IP protocol stack adds (or deletes) a route entry in its routing table, it sends a route_add (or route_delete) message down to the Route Synchronization module 114. If the node is the master, it is responsible for notifying all other L3 switches to add (or delete) the route entry. It continues advertising the route update to an L3 slave until an acknowledgment is received from the slave, or the slave no longer exists in the topology map.

Figure 15:
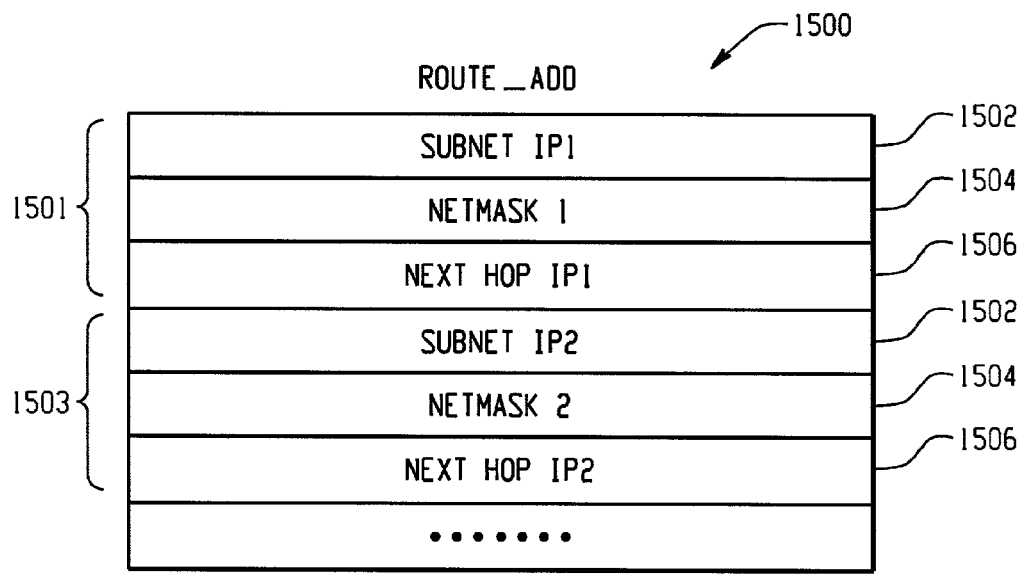
FIG. 15 illustrates a packet structure for a route_add message of the SSI module.
Figure 16:
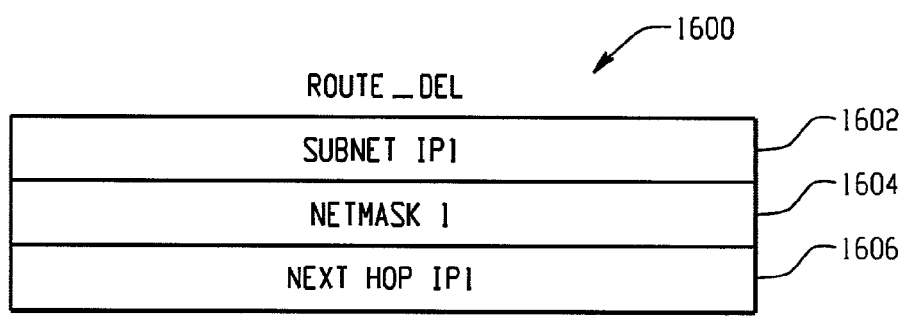
FIG. 16 illustrates a packet structure for a route_del message of the SSI module.

Referring now to FIG. 15, there is illustrated a structure of a route_add message 1500 of the Route Synchronization module 114. The message 1500 comprises sets of information fields (e.g., 1501 and 1503) each associated with a subnet IP 1502, a netmask field 1504, and next hop field 1506. Referring now to FIG. 16, there is illustrated a structure of a route_del message 1600 of the Route Synchronization module 114. The message 1600 comprises a subnet IP field 1602, a netmask field 1604, and next hop field 1606.

When an L3 slave receives a route_add notification from the master, it obtains the route entry in the routing protocol stack's routing table. If the entry does not exist, the L3 slave calls a routing protocol stack's API to add the entry. If the entry exists, but is different, it calls the routing protocol stack's API to delete the existing entry, and then adds the new one. When a slave receives a route_delete notification from the master, it calls an routing protocol stack's API to delete the route entry. When the routing protocol stack's sends a corresponding route_add/route_delete message down to the Route Synchronization module 114 at the slave, it does not advertise the route update because it is not the master. In all cases, it sends an acknowledgment back to the master. When the Route Synchronization module 114 receives a message from routing protocol stack, it sends the message down to the firmware 126 to update the firmware 126 L3 routing table.

When the master detects that a new L3 switch is added to the topology map, it is responsible for bringing up the new L3 switch routing table. The master first sends a route_purge message to the new L3 slave, and wait for an acknowledgment before sending any route_add messages. An L3 slave purges its routing table when it detects that the master is unreachable, or when a route_purge message is received from the master.

Figure 17:
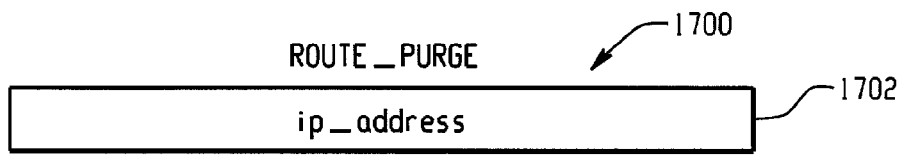
FIG. 17 illustrates a packet structure for a route_purge message of the SSI module.

Referring now to FIG. 17, there is illustrated a structure of a route_purge message 1700 of the Route Synchronization module 114. The message 1700 contains an ip_address field 1702. If the ip_address field 1702 is zero, it is a purge of all outing table entries learned from the master. Else, it is a purge of all routing table entries learned from the master with outgoing interface configured with the ip_address. The route_add message 1500, route_delete message 1600, and route_purge message 1700 are used to synchronize indirect routes.

Note that interface_up( )/interface_down( ) event for a route interface at the master does not depend on its own VLAN domain for the corresponding VLAN, since every L3 slave joins each route interface VLAN. Thus even though all non-stack ports are down, the VLAN domain at the master is not empty. The following scheme is used to determine interface_up( )/interface_down( ) event at the master. A slave notifies the master when its external VLAN domain for a route interface VLAN becomes empty or non-empty. At the master, an interface_up( ) event for a route interface VLAN X occurs if the union of all external VLAN domains of X from all switches in the stack become non-empty. An interface_down( ) event occurs if the union of all external VLAN domains of X from all switches in the stack become empty.

Figure 18:
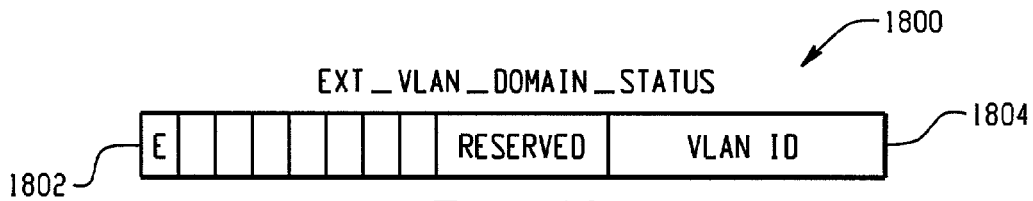
FIG. 18 illustrates a packet structure for an external VLAN domain status message of the SSI module.

Referring now to FIG. 18, there is illustrated a packet structure for an external VLAN domain status message 1800 of the Route Synchronization module 114. An E_flag field 1802 indicates that an external VLAN domain becomes empty, if E_flag=1; else, it is not empty. A VLAN ID field 1804 provides the identifier information of the VLAN associated with a route interface subnet. The EXT_VLAN_DOMAIN_STATUS message 1800 is sent from a slave to the master.

Figure 19:
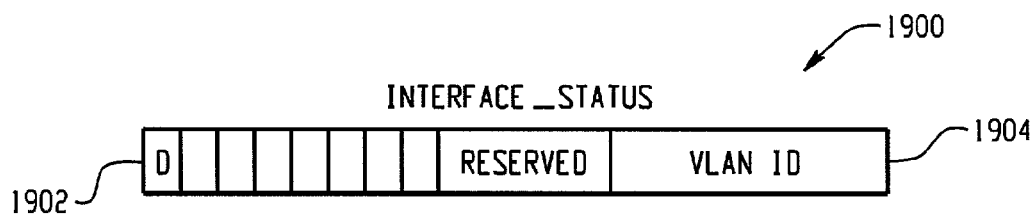
FIG. 19 illustrates a packet structure for an interface status message of the SSI module.

Referring now to FIG. 19, there is illustrated a packet structure for interface status message 1900 of the Route Synchronization module 114. A D_flag field 1902 indicates that an IP interface becomes down, if D_flag=1; else, it becomes up. A VLAN ID field 1904 provides the identifier information for the VLAN associated with a route interface subnet. The INTERFACE_STATUS message 1900 is sent from the master to all L3 slaves. Interface_status message is used to synchronize the status of direct routes.

Layer 3 Traffic Coordinator Module

The Layer 3 (L3) Traffic Coordinator module 116 together with the Route Synchronization module 114 make a stack of switches behave externally as a single router. The switches in the stack may or may not be L3-capable, but at least one of them is L3-capable. All L3-capable switches in the stack route packets substantially simultaneously. Every packet routed through the stack is routed exactly once by one of the L3-capable switches. The stack is configured with N routing interfaces, each with a distinct route interface IP address. The management station can configure the stack through the single stack IP address, which may be one of the route interface IP addresses. When the stack route interfaces are configured, the master distributes the configuration to every switch in the stack through the Stack Management Protocol 108. After receiving the configuration for a route interface from the master, each L3-capable switch configures a route interface with the corresponding route interface IP address (possibly first creating the VLAN.) Each Layer 2-only (L2) switch creates and joins the route interface VLAN. Each switch in the stack elects its own head router. For each L3 capable switch, its head router is itself. For each L2-only switch, its head router is the nearest L3-capable switch in the stack tree. Switch IDs are used for tie-breaking, if more than one L3-capable switch exists with the same "distance" from a switch. Each switch directs to its head router the traffic that will be routed through the stack and inbound via the switch. For a stack with M L3-capable switches, this essentially partitions the switching domain into M regions. Each L3-capable switch handles traffic routed through the stack from one of the regions. A switch directs traffic to its head router by a mechanism detailed as follows.

Address Resolution Protocol (ARP) Table Maintenance

ARP tables of switches in the stack are loosely synchronized. Each L3-capable switch maintains its own ARP table independently, i.e., creation and deletion of ARP table entries is completely at the discretion of each switch. Consistency among the ARP tables can be accomplished as follows. When an ARP request broadcast is sent on a route interface subnet, the packet is flooded to the corresponding VLAN and is therefore forwarded to the master and all L3-capable switches. Consequently, every switch in the stack receives the packet and maintains its ARP table based upon the source-IP-address to-source-MAC-address mapping in the packet. Software of the master and of the L3 switches receives all ARP request packets on each route interface subnet and all ARP response packets destined for the stack (i.e., target IP address=one of the route interface IP addresses) so that the ARP tables can be maintained correctly. When a switch in the stack sends an ARP request packet and an ARP response packet is returned, the switch receiving the ARP response packet forwards the packet to all of the other switches in the stack via the Stack Communication Layer 112.

To ensure that all L3 switches route packets simultaneously, and each L3 switch routes packets coming from one of the regions in the switching domain, the following scheme is implemented.

ARP Request Packet Handling

When an ARP request packet, requesting one of the route interface IP addresses, is received by a switch in the stack, and the packet is not received from a stack port and the switch head router exists, the switch sends an ARP Response packet, where the Source MAC address of the packet is head router MAC address, the Destination MAC address of the packet is the Sender MAC address in the received ARP PDU (Protocol Data Unit), the Sender IP address in the ARP PDU is the requested route interface IP address, the Sender MAC address in the ARP PDU is the head router MAC address, the Target IP address in the ARP PDU is the Sender IP address in the received ARP PDU, and the Target MAC address in the ARP PDU is the Sender MAC address in the received ARP PDU. If the sender IP indicates MAC mapping changes, the ARP entry is updated.

Sending ARP Request Packets

Figure 20:
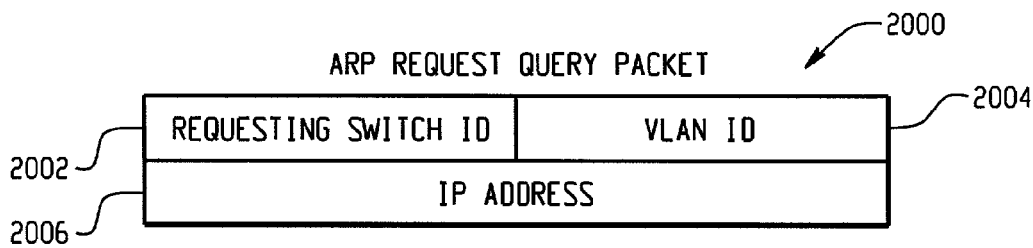
FIG. 20 illustrates a packet structure for an ARP request query message.

When a switch needs the ARP mapping of an IP address, and its IP interface for the corresponding subnet is only configured with the route interface IP address, then the switch broadcasts a proprietary ARP request query message internally to the rest of the stack. The ARP request query message has the following flag settings in the common protocol frame header 2400: H_flag=B_flag=0, T_flag=1. Referring now to FIG. 20, there is illustrated a packet structure for an ARP request query message 2000. The message 2000 comprises a requesting switch ID filed 2002, a VLAN ID filed 2004, and an IP address field 2006.

When a switch receives an ARP request query message, it searches its ARP table. If the entry exists, it sends an ARP response indication message to the requesting switch with the following flag settings in the common protocol frame header 2400: H_flag=B_flag=T_flag=0. Otherwise, for each non-stack port, it sends an ARP request packet, where the Source MAC address of the packet is the head router MAC address, the Destination MAC address of the packet is 0xFFFFFFFF, the Sender IP address in the ARP PDU is the route interface IP address, the Sender MAC address in the ARP PDU is the head router MAC address, the Target IP address in the ARP PDU is the requested IP address in the received ARP Request Query message, and the Target MAC address in the ARP PDU is zero.

Figure 21:
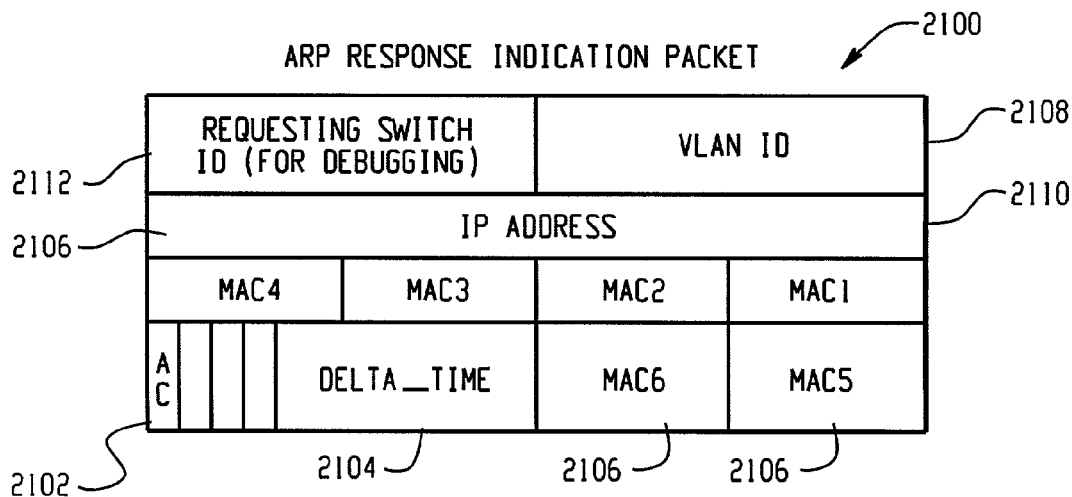
FIG. 21 illustrates a packet structure for an ARP response indication message.

Referring now to FIG. 21, there is illustrated a packet structure of an ARP response indication message 2100. The message comprises an AC_flag field 2102 which when set, indicating that the ARP response indication message is based upon an existing ARP entry, and a delta_time field 2104 which indicates the elapsed time since the ARP entry is created (the delta_time field 2104 is relevant if and only if AC_Flag=1). When a switch receives more than one ARP response indication message 2100, it accepts the message 2100 with AC_flag=0. If all of the responses have AC_flag=1, the switch accepts the response with the smallest delta_time. Other fields of the response message 2100 include various MACx address fields 2106, a VLAN ID field 2108, an IP address field 2110, and a requesting switch ID field 2112 which is used for debugging purposes.

ARP Response Packet Processing

When a switch CPU receives an ARP response, it broadcasts an ARP response indication message with the following flag settings in the common protocol frame header 2400: H_flag=B_flag=0, T_flag=1.

Sending Gratuitous ARP Packets

After an STP topology change or stack topology change, a switch broadcasts a gratuitous ARP Request packet to each non-stack port, where the Source MAC address of the packet is the head router MAC address, the Destination MAC address of the packet=0xFFFFFFFF, the Sender IP address in the ARP PDU is the route interface IP address, the Sender MAC address in the ARP PDU is the head router MAC address, the Target IP address in the ARP PDU is the route interface IP address, the Target MAC address in the ARP PDU is zero.

Handling of Packets Destined for a Route Interface IP Address

When an L3 switch receives a packet destined for one of the route interface IP addresses, it changes the Destination MAC address to the master MAC address, and forwards the packet to the master. Note that the stack IP address may be the same as one of the route interface IP addresses. If so, ARP request packet processing for the stack IP address can done as described hereinabove with respect to ARP Request packet processing, and packets destined for the stack IP address are forwarded to the master, as described hereinabove. Otherwise, the master responds to the ARP request packet by mapping the stack IP address to the master MAC address.

ARP Request Packet Processing Example

Figure 22:
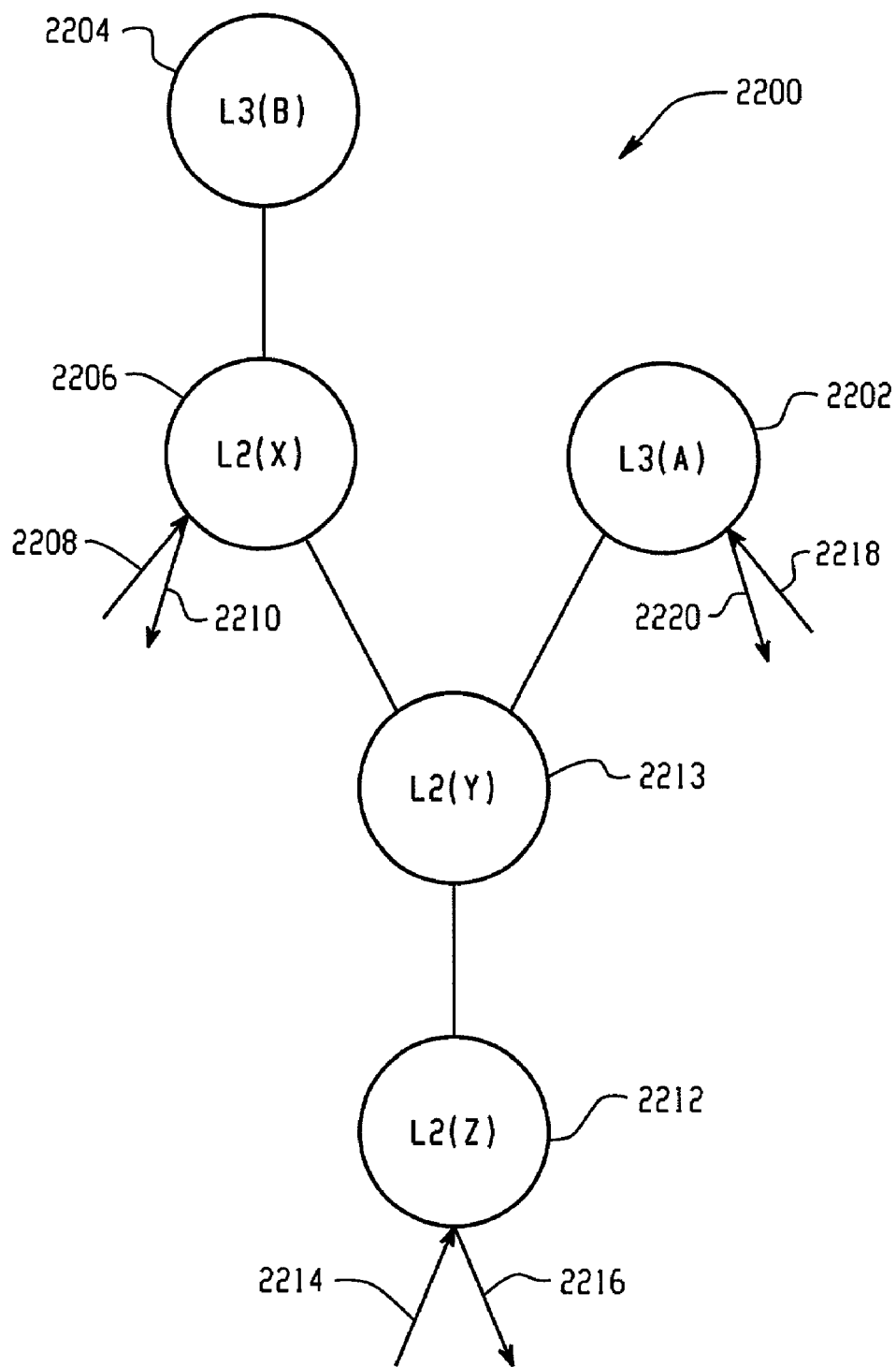
FIG. 22 illustrates a block diagram for an example of ARP request packet processing, according to a disclosed embodiment.

Referring now to FIG. 22, there is illustrated a block diagram for an example of ARP request packet processing, according to a disclosed embodiment. For example, in a stack tree 2200 of five switches, assume that the Topology Discovery protocol 102 builds the stack tree 2200, as illustrated, with a switch 2202 and switch 2204 both L3-capable, and switches 2206, 2212, and 2213 L2-capable, only. If the L2-capable switch 2206 receives an ARP request packet 2208 from a non-stack port for one of the route interface IP addresses, switch 2206 sends an ARP response message 2210 with the MAC address of switch 2204 (i.e., MACb), since switch 2204 is the head router of switch 2206. Similarly, if the L2-capable switch 2212 receives an ARP request packet 2214 for one of the route interface IP addresses, from a non-stack port, the L2-capable switch 2212 sends an ARP response packet 2216 with the MAC address of the L3-capable switch 2202 (i.e., MACa). If the L3-capable switch 2202 receives an ARP request packet 2218 from a non-stack port, it sends an ARP response message 2220 with its own MAC address (i.e., MACa).

Sending ARP Request Packets Example

Figure 23:
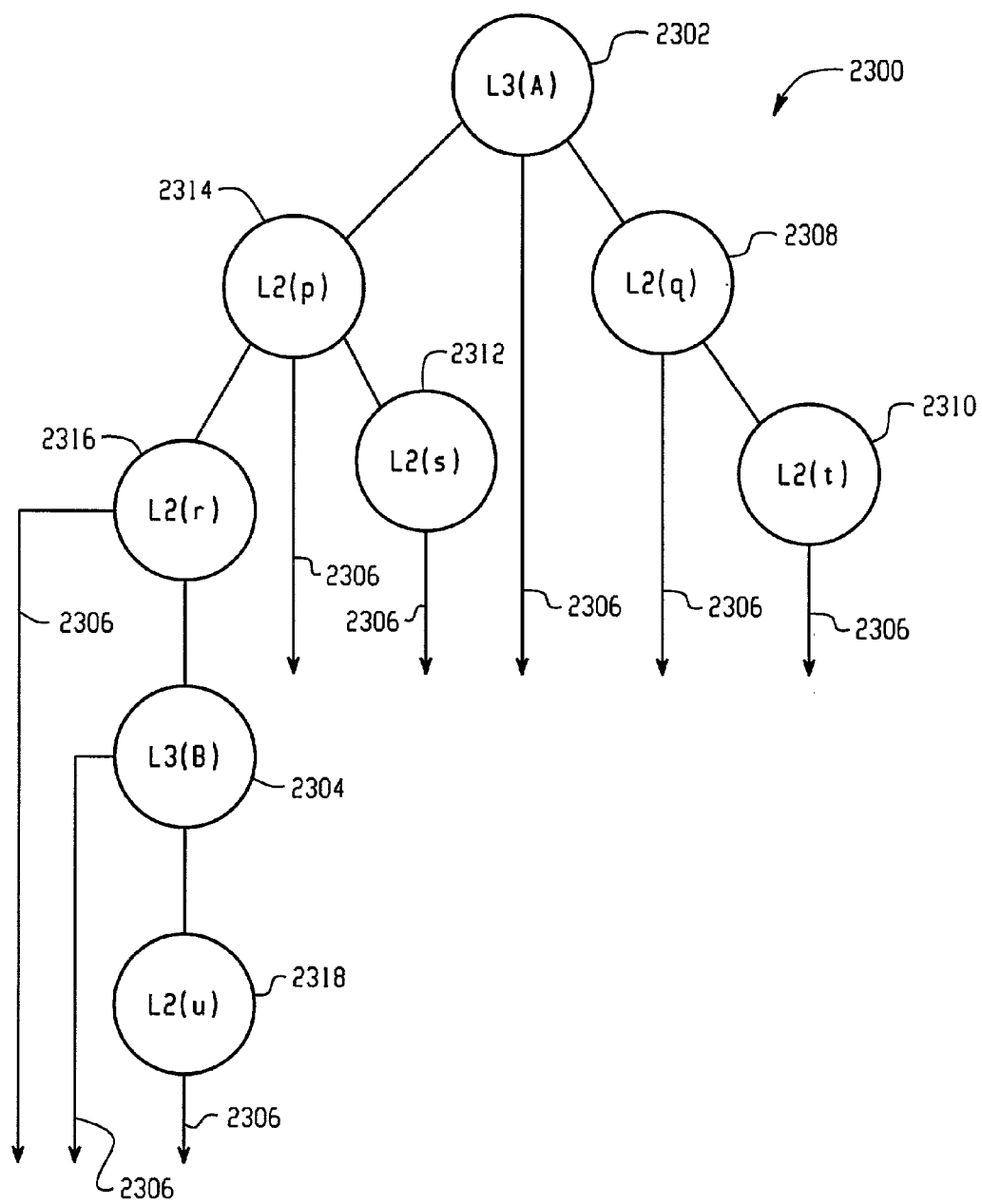
FIG. 23 illustrates a block diagram of a stack tree of eight switches for demonstrating the sending ARP request packets.

Referring now to FIG. 23, there is illustrated a block diagram of a stack tree 2300 of eight switches for demonstrating the sending ARP request packets. Assume switch 2302 and switch 2304 are L3-capable, and that each switch in the stack has a non-stack port (shown as arrowed lines 2306). Assume also the switch 2302 needs the ARP mapping of an IP address, which is not available in any of the switch ARP tables. Switch 2302 broadcasts an ARP request query to the other seven switches (2304, 2308, 2310, 2312, 2314, 2316, and 2318) in the stack. When switch 2316, switch 2318, and switch 2304 each receive the query, each sends an ARP request packet to its non-stack port 2306. The ARP request packet contains the route interface IP address on the subnet as the sender IP address, and the MAC address of switch 2304 as the sender MAC address, since switch 2304 is the head router of switches 2316, 2318, and itself(i.e., 2304). Similarly, switch 2314, switch 2308, switch 2312, switch 2310, and switch 2302 each send an ARP request packet to its corresponding non-stack port 2306. The ARP request packet has the route interface IP address on the subnet as the sender IP address, and the MAC address of switch 2302 as the sender MAC address.

IGMP

IGMP snooping can be performed independently at each switch node. IGMP queries and IGMP reports received at a switching node from VLAN V are relayed to other switching nodes by flooding to its VLAN domain for V (other than the incoming port). Additionally, if IGMP-snooping is enabled in a switching node, all IGMP queries and IGMP reports are forwarded to its CPU (whether an L2 or L3 switch).

Partitioning of the Stack

Where the stack is partitioned, the majority partition continues running in the stacking mode. Switches in the other partitions switch to the standalone mode. When switching to the standalone mode, a switch performs the following. If an L2 switch, and it does not have any IP address other than the stack route interface IP configured on a stack route interface, then its CPU leaves the corresponding VLAN domain. If an L3 switch, it deletes all stack route IP addresses.

If the master is not an L3 switch (i.e., no L3 switch exists in the majority partition), then all L2 switches in the partition leave every route interface VLAN.

Note with the disclosed architecture, there is no continuous flooding for packets with a destination MAC that have been learned by other switches in the stack. Additionally, the disclosed architecture is applicable, but not limited to list, ring, star, tree, or mesh topologies. The architecture applicable to both L2 and L3 switches. All L3 switches route IP packets substantially simultaneously. A single software image exists for each platform. When there is only one switch in the stack, it behaves exactly as a regular switch. Switches having the disclosed architecture can also be hot swappable (i.e., capable of being connected or disconnected in a stack configuration when powered on).

Although the preferred embodiment has been described in detail, it should be understood that various changes, substitutions and alterations can be made therein without departing from the spirit and scope of the invention as defined by the appended claims.

What is claimed is:

1. A method for selecting a master switch from a plurality of switches in a stack, each switch in the stack having at least one stack port for communication with at least another one of the plurality of switches in the stack, the method comprising:

each switch in the stack communicating with at least one other switch in the stack via the at least one stack port thereof;

determining whether at least one of the plurality of switches in the stack is an OSI Layer 3 switch;

where at least one OSI Layer 3 switch is found in the stack, selecting the OSI Layer 3 switch having the lowest switch identification as the master switch of the stack; and where no OSI Layer 3 switch is found in the stack, selecting the switch having the lowest switch identification as the master switch of the stack;

wherein the lowest switch identification is computed based on a unique Media Access Control address assigned to each switch in the stack, an Internet Protocol address assigned to each switch in the stack, a weight assigned to the stack port via which the switch is accessed, and a link cost assigned thereto.

2. A method according to claim 1, wherein responsive to the determining step finding no OSI Layer 3 switch in the stack, the method further comprising:

adding a new switch to the stack;

determining a modified topology resulting from the addition of the new switch to the stack; and selecting the new switch as the master switch responsive to the new switch being an OSI Layer 3 switch.

3. A method according to claim 1, wherein responsive to the determining step finding at least one OSI Layer 3 switch in the stack, the method further comprising:

adding a new switch to the stack;

determining a modified topology resulting from the addition of the new switch to the stack; and selecting the new switch as the master switch responsive to the new switch being an OSI Layer 3 switch having the lowest switch identification in the augmented stack.

4. A method according to claim 1, and further comprising:

joining together two partitions of the stack of switches into a combined stack;

determining whether at least one of the switches from either one of the two partitions of the stack of switches is an OSI Layer 3 switch;

where at least one OSI Layer 3 switch is found in the combined stack, selecting the OSI Layer 3 switch having the lowest switch identification as the master switch of the combined stack; and where no OSI Layer 3 switch is found in the combined stack, selecting the switch having the lowest switch identification as the master switch of the combined stack.

5. A method for distributed OSI Layer 3 packet processing for a stacked switch configuration having a plurality of switches, wherein at least two of the plurality of switches in the stack are OSI Layer 3 switches and at least one of the plurality of switches is an OSI Layer 2 switch, the method comprising:

assigning every OSI Layer 3 switch as a head router to itself;

assigning to every OSI Layer 2 switch as its head router the closest OSI Layer 3 switch thereto; and assigning one of the at least two OSI Layer 3 switches as a master switch for stacked switch configuration;

wherein the closeness to an OSI Layer 3 switch is measured as the number of hops between the OSI Layer 2 switch and the OSI Layer 3 switch as determined from the topology of the stack.

6. A method according to claim 5, wherein at least two switches in the stack each have at least one external port for communication with network entities outside of the stack, the method further comprising:

receiving via an external port an ARP request at an OSI Layer 3 switch that is not the master switch of the stack; and sending a response to the ARP request, the response having the MAC address of the OSI Layer 3 switch as a source MAC address.

7. A method according to claim 5, wherein at least two switches in the stack each have at least one external port for communication with network entities outside of the stack, the method further comprising:

receiving an ARP request at one of the OSI Layer 2 switches via an external port; and sending a response to the ARP request, the response having the MAC address of the closest OSI Layer 3 switch as a source MAC address.

8. A method according to claim 5, wherein each switch in the stack has at least one stack port for communication with at least another one of the plurality of switches in the stack, at least two switches in the stack each having at least one external port for communication with network entities outside of the stack, the method further comprising:

receiving an ARP request bearing an address which cannot be resolved by any switch in the stack, and broadcasting the ARP request via stack ports to each switch in the stack;

wherein each switch in the stack, responsive to the broadcast; forwards the ARP request via the non-stack port associated therewith, the forwarded ARP request having as a route interface IP address the sender's IP address and as a MAC address of the head router the sender's MAC address.

* * * * *